(12) United States Patent
Behrens et al.

(10) Patent No.: US 12,533,201 B2
(45) Date of Patent: Jan. 27, 2026

(54) SYSTEMS AND METHODS FOR CONTROLLING MAGNETIC MICRODEVICES WITH MACHINE LEARNING

(71) Applicant: UNIVERSITY OF PITTSBURGH—OF THE COMMONWEALTH SYSTEM OF HIGHER EDUCATION, Pittsburgh, PA (US)

(72) Inventors: Michael R. Behrens, Loudon, NH (US); Warren C. Ruder, West Mifflin, PA (US)

(73) Assignee: UNIVERSITY OF PITTSBURGH—OF THE COMMONWEALTH SYSTEM OF HIGHER EDUCATION, Pittsburgh, PA (US)

( * ) Notice: Subject to any disclaimer, the term of this patent is extended or adjusted under 35 U.S.C. 154(b) by 141 days.

(21) Appl. No.: 18/610,786

(22) Filed: Mar. 20, 2024

(65) Prior Publication Data
US 2024/0225764 A1 Jul. 11, 2024

Related U.S. Application Data

(63) Continuation of application No. PCT/US2022/046577, filed on Oct. 13, 2022.
(Continued)

(51) Int. Cl.
*A61B 34/00* (2016.01)
*G01R 33/038* (2006.01)
(Continued)

(52) U.S. Cl.
CPC .............. *A61B 34/73* (2016.02); *A61B 34/72* (2016.02); *G01R 33/038* (2013.01);
(Continued)

(58) Field of Classification Search
CPC ... A61B 34/73; A61B 34/72; A61B 2034/731; A61B 2090/378; G01R 33/038;
(Continued)

(56) References Cited

U.S. PATENT DOCUMENTS

| 10,082,144 B2 | 9/2018 | Sitti et al. |
| 2005/0029978 A1 | 2/2005 | Oleynikov et al. |

(Continued)

OTHER PUBLICATIONS

Yu, et al., "Modeling Electromagnetic Navigation Systems for Medical Applications using Random Forests and Artificial Neural Networks", In: 2020 IEEE International Conference on Robotics and Automation (ICRA), May 31-Aug. 31, 2020 [online] [retrieved on Jan. 10, 2023], Retrieved from the Internet: https://ieeexplore.ieee.org/document/9197212.
(Continued)

*Primary Examiner* — Lee E Rodak
*Assistant Examiner* — Zannatul Ferdous
(74) *Attorney, Agent, or Firm* — Baker Botts L.L.P.

(57) ABSTRACT

A system for controlling a magnetic microdevice to move within a fluidic environment, comprising an imaging device, a multi-axis electromagnet for generating a magnetic field based on sinusoidal current signals, and a controller for controlling the multi-axis electromagnet based on a machine-learning model, and wherein for training the machine-learning model, the controller is configured to receive images of the fluidic environment and the magnetic microdevice from the imaging device, determine a state comprising position information of the magnetic microdevice based on the images, calculate a measure of perfor-
(Continued)

mance associated with a first set of sinusoidal current signals previously inputted to the multi-axis electromagnet, wherein the calculated measure of performance is used to adjust parameters of the machine-learning model, and generate based on the position information and the first set of sinusoidal current signals using the machine-learning model, a second set of sinusoidal current signals as inputs for the multi-axis electromagnet.

20 Claims, 24 Drawing Sheets

Related U.S. Application Data

(60) Provisional application No. 63/255,925, filed on Oct. 14, 2021.

(51) Int. Cl.
   *G01R 33/385* (2006.01)
   *G06N 3/092* (2023.01)
   *G06T 7/70* (2017.01)

(52) U.S. Cl.
   CPC .......... *G01R 33/385* (2013.01); *G06N 3/092* (2023.01); *G06T 7/70* (2017.01); *A61B 2034/731* (2016.02)

(58) Field of Classification Search
   CPC ...... G01R 33/385; G01R 33/02; G06N 3/092; G06N 3/045; G06N 3/08; G06T 7/70; B03C 1/288; G05B 19/00; G05F 1/10; B25J 9/163; B25J 9/161; G05D 1/0088
   See application file for complete search history.

(56) References Cited

U.S. PATENT DOCUMENTS

| | | |
|---|---|---|
| 2007/0178516 A1 | 8/2007 | Sosnowski et al. |
| 2011/0270434 A1* | 11/2011 | Fischer .................. B82Y 15/00 700/117 |
| 2020/0201292 A1* | 6/2020 | Cella .................. G05B 23/0259 |
| 2021/0141034 A1 | 5/2021 | Sharma et al. |

OTHER PUBLICATIONS

Carlsen, et al., "Magnetic steering control of multi-cellular bio-hybrid microswimmers", In: Lab Chip, 2014, 14, 3850, Aug. 2014 [online] [retrieved on Jan. 10, 2023], Retrieved from the Internet: https://pubs.rsc.org/en/content/articlelanding/2014/1c/c41c00707g.
International Search Report mailed Feb. 16, 2023, in International Application No. PCT/US2022/046577.

* cited by examiner

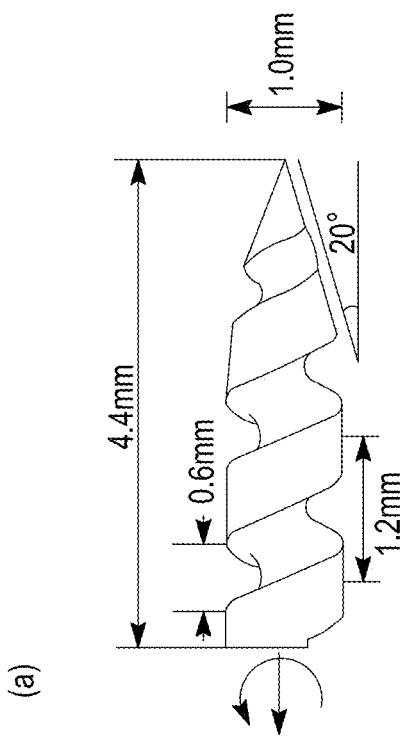
FIG. 3A
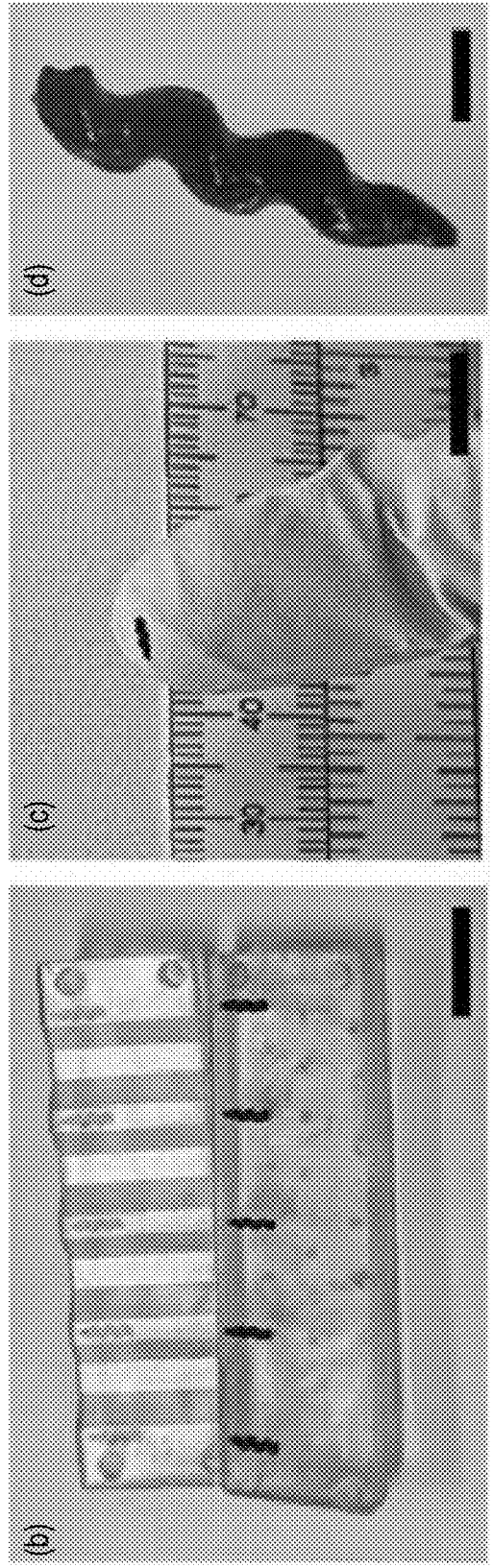
FIG. 3B
FIG. 3C
FIG. 3D (a) State-based input (b) Image-based input

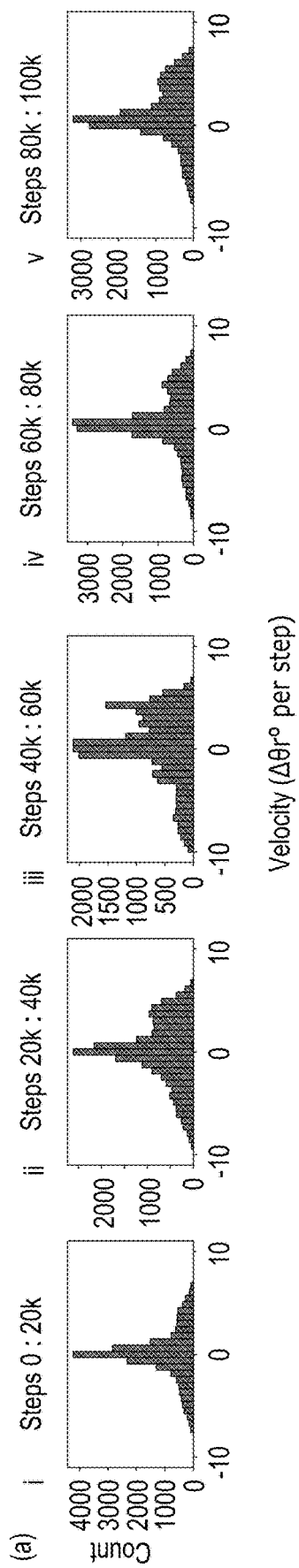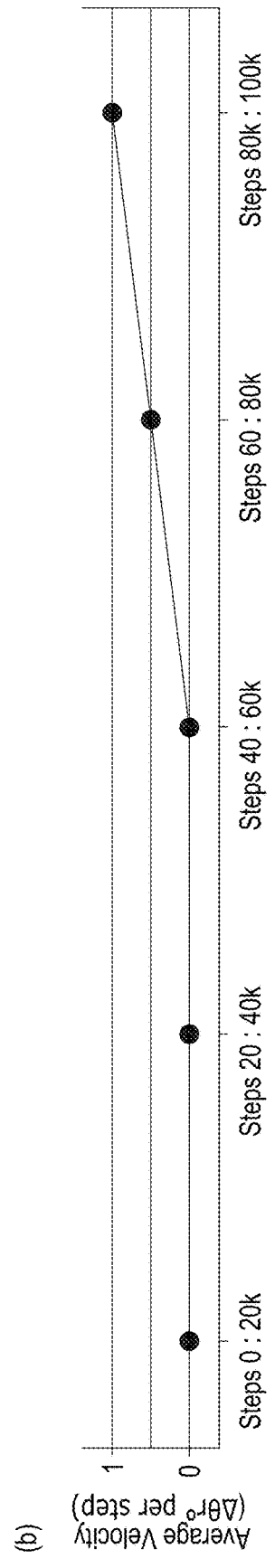
FIG. 5A
FIG. 5B (g)

(h)

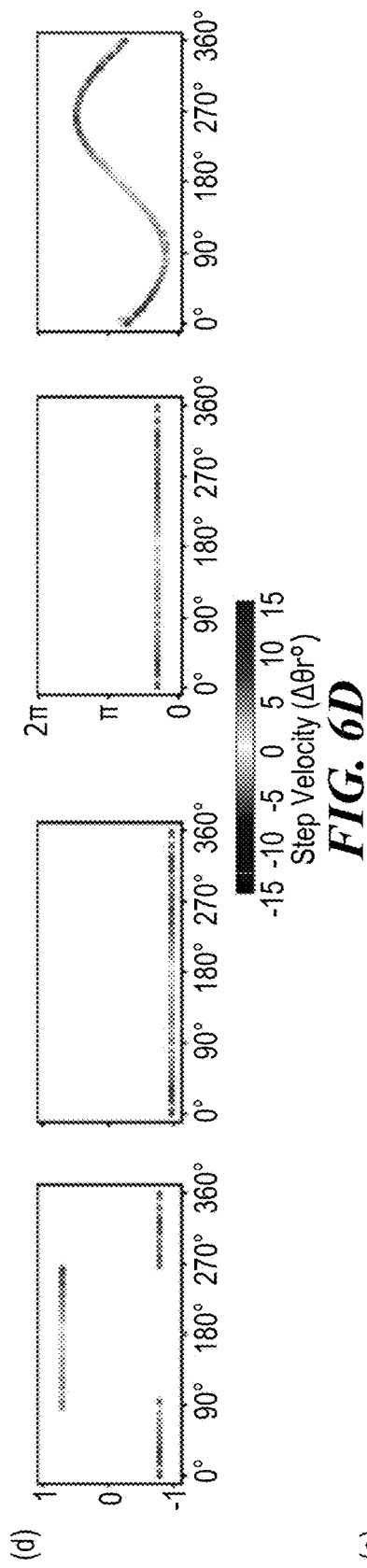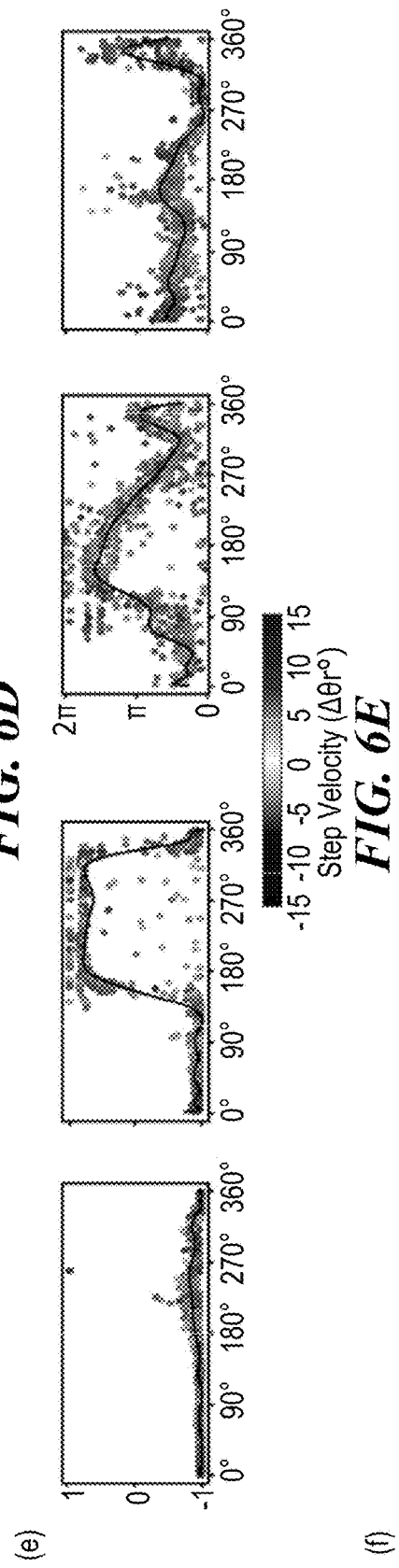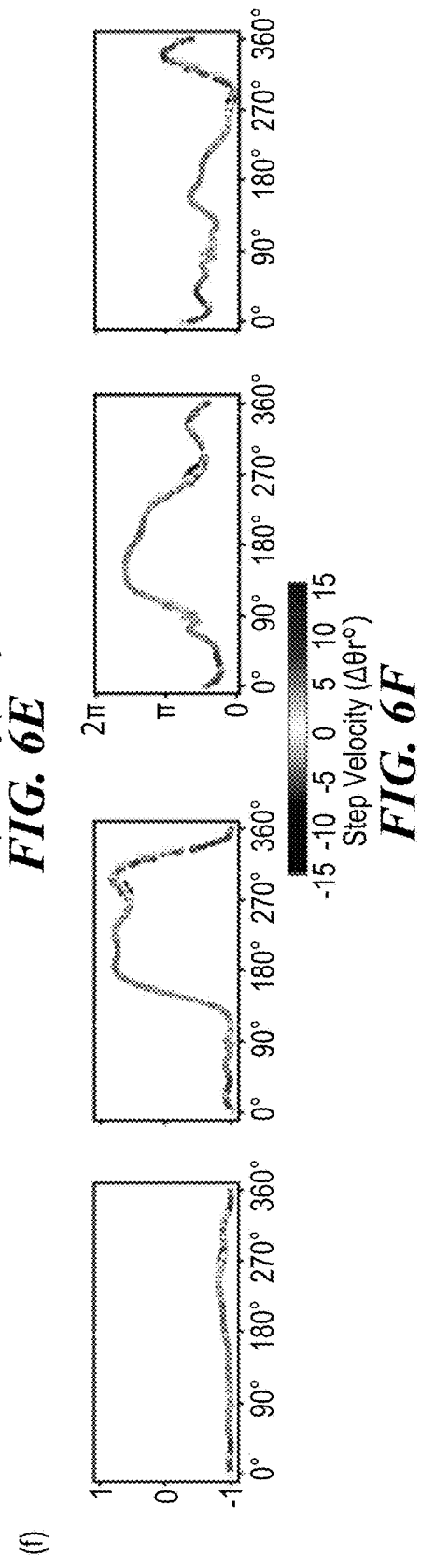
FIG. 6D
FIG. 6E
FIG. 6F

SYSTEMS AND METHODS FOR CONTROLLING MAGNETIC MICRODEVICES WITH MACHINE LEARNING

CROSS-REFERENCE TO RELATED APPLICATIONS

This application is a continuation of International Application No. PCT/US2022/046577, filed Oct. 13, 2022, which claims the benefit of priority of U.S. Provisional Patent Application No. 63/255,925, filed Oct. 14, 2021, the contents of which are incorporated herein by reference in their entireties, and to which priority is claimed.

STATEMENT REGARDING FEDERALLY-SPONSORED RESEARCH

This invention was made with government support under N00014-17-12306 awarded by the US Navy/Office of Naval Research, 1709238 awarded by the National Science Foundation, EB001026 and GM132934 awarded by the National Institutes of Health, and FA9550-18-1-0262 awarded by the US Air Force/Air Force Office of Scientific Research (AFOSR). The government has certain rights in the invention.

BACKGROUND

Micro-robotic systems and other microdevices have received attention for performing micromanipulation tasks and particularly for their potential therapeutic biomedical applications. The design of micro-robotic systems is trending towards the use of complex composite materials, dynamic morphologies, and integrated biological components. Certain microrobots are designed to operate in complex and uncharacterized environments. These factors create difficulties when constructing dynamic and kinematic models of micro-robotic behavior, making it especially complex and challenging to use classical feedback control systems to coordinate microrobot behaviors.

Along with control approaches, remote actuation methods for untethered, free-moving microrobots can take a variety of forms, and microrobots can be controlled via externally created energy fields that interact with the robot to induce motion. Microrobots have been driven with light, electric fields, ultrasound, or magnetic fields. Controlling the microrobots can require an accurate dynamic model of the complete system, including the dynamics of the robot, the environment, and the actuator. The difficulty in accurately modeling the dynamics of microrobot behavior increases significantly for microrobots with complex magnetization profiles, soft material composition, or active shape-changing capabilities. As the capabilities and associated complexity of micro-robotic systems expand, the difficulty of creating accurate dynamic models of the system behavior increases as well. Control of more kinematically complex real-world microrobots that operate in dynamic biomimetic microfluidic environments with clinically relevant magnetic actuation is still challenging.

Therefore, there remains a need in the art for improved controlling techniques of kinematically complex microrobots.

SUMMARY

The purpose and advantages of the disclosed subject matter will be set forth in and are apparent from the description that follows, as well as will be learned by practice of the disclosed subject matter. Additional advantages of the disclosed subject matter will be realized and attained by the devices particularly pointed out in the written description and claims hereof, as well as from the appended drawings.

Aspects of the disclosed subject matter include a system for controlling magnetic microdevices in a fluidic environment. As embodied herein, the system includes a magnetic microdevice configured to move within the fluidic environment. The magnetic microdevice includes a magnetically susceptible polymer in a helical configuration. The system further includes an imaging device configured to obtain images of the fluidic environment, where each image indicates a position of the magnetic microdevice in the fluidic environment, and a multi-axis electromagnet including a plurality of electromagnetic coils each associated with a respective axis, where the plurality of electromagnetic coils each is configured to receive a sinusoidal current signal and generate, based at least in part on the received sinusoidal current signal, a magnetic field associated with the axis of the electromagnetic coil, and where a superposition of the plurality of generated magnetic fields produces a non-uniform time-varying magnetic field in the fluidic environment. The system further includes a controller configured to control the multi-axis electromagnet based on a machine-learning model, where the controller is coupled to the imaging device and the multi-axis electromagnet. For each of a plurality of time steps in a training session for the machine-learning model, the controller is configured to receive, from the imaging device, a plurality of images of the fluidic environment and the magnetic microdevice, determine, based on the plurality of images, a state of the magnetic microdevice, the state including position information of the magnetic microdevice, calculate, based at least in part on the position information of the magnetic microdevice, a measure of performance associated with a first set of sinusoidal current signals previously inputted to the multi-axis electromagnet, where the calculated measure of performance is used to adjust a set of parameters associated with the machine-learning model, and generate, using the machine-learning model, based at least in part on the position information of the magnetic microdevice and the first set of sinusoidal current signals, a second set of sinusoidal current signals as inputs for the multi-axis electromagnet.

For purpose of illustration and not limitation, and as embodied herein, the state of the magnetic microdevice can determined based on a plurality of state vectors, for example where each state vector is associated with one of the plurality of images received from the imaging device, and where each state vector is based at least in part on position information extracted from the associated image.

Additionally or alternatively, and as embodied herein, the state vectors can include parameters associated with one or more of: a position of the magnetic microdevice, a goal position of the magnetic microdevice, a magnitude of each of the first set of sinusoidal current signals, a phase angle for each of the first set of sinusoidal current signals, or a measure of time remaining in the training session.

Furthermore, and as embodied herein, the machine-learning model can include an artificial neural network. The artificial neural network can be a multilayer perceptron neural network, and where the plurality of state vectors is input to the multilayer perceptron neural network to calculate the measure of performance.

In addition, and as embodied herein, the plurality of images can be a set of sequential images of the magnetic microdevice, and where the state of the magnetic microdevice includes the set of sequential images.

In certain embodiments, each of the sequential images can be augmented to indicate a goal position of the magnetic microdevice.

In some embodiments, the machine-learning model can include an artificial neural network, which can be a convolutional neural network, and where the state of the magnetic microdevice including the set of augmented images is input to the convolutional neural network.

In some embodiments, the non-uniform time-varying magnetic field in the fluidic environment produced by the multi-axis electromagnet causes one or more forces or torques to be applied to the magnetic microdevice.

In additional embodiments, the helical configuration of the magnetically susceptible polymer of the magnetic microdevice transduces the one or more forces or torques into a movement of the magnetic microdevice through the fluidic environment.

In certain embodiments, the measure of performance can be a reward signal representing a degree of desired behavior corresponding to the movement of the magnetic microdevice corresponding to the first set of sinusoidal current signals previously input to the multi-axis electromagnet.

Additionally or alternatively, and as embodied herein, the machine-learning model can include an artificial neural network, which can be iteratively trained over the plurality of time steps in the training session, by inputting, at each time step, the reward signal to a reinforcement learning algorithm.

Furthermore, and as embodied herein, a measure of training session parameter performance is evaluated for each of a plurality of training sessions, where a rolling average of the training session parameter performance is periodically calculated over a predetermined number of previous training sessions, and where a set of parameters for a training session is saved as an updated magnetic microdevice control model if the rolling average of training session parameter performance associated with the training session exceeds a rolling average of training session parameter performance associated with a previously saved magnetic microdevice control model.

In some embodiments, the multi-axis electromagnet is a three-axis electromagnetic coil actuator including three electromagnetic coils, each associated with an X-axis, a Y-axis, or a Z-axis.

In additional embodiments, each sinusoidal current signal received by an electromagnetic coil can be a pulse-width modulated (PWM) signal generated by the controller.

In certain embodiments, the imaging device can be configured to obtain optical images of the fluidic environment. Additionally or alternatively, the imaging device can be configured to obtain ultrasound images of the fluidic environment.

Furthermore, and as embodied herein, the magnetically susceptible polymer can be an agar hydrogel uniformly diffused with iron oxide nanoparticles.

In addition, and as embodied herein, the multi-axis electromagnet and the imaging device can be integrated into a handheld unit configured to be moved along a surface of an opaque object.

In certain embodiments, the controller is further configured to dynamically identify an optimal magnetic field for controlling the magnetic microdevice based on a relative position of the magnetic microdevice to a position of the handheld unit and a goal position of the magnetic microdevice.

Aspects of the disclosed subject matter include a method for controlling magnetic microdevices in a fluidic environment. As embodied herein, the method includes receive, from an imaging device configured to obtain images of a fluidic environment, a plurality of images of the fluidic environment and a magnetic microdevice within the fluidic environment. The magnetic microdevice is configured to move within the fluidic environment based on a magnetic field, where the magnetic field is generated by a multi-axis electromagnet based on sinusoidal current signals inputted to the multi-axis electromagnet. The method further includes determining, based on the plurality of images, a state of the magnetic microdevice, the state comprising position information of the magnetic microdevice. The method further includes calculating, based at least in part on the position information of the magnetic microdevice, a measure of performance associated with a first set of sinusoidal current signals previously inputted to the multi-axis electromagnet. The calculated measure of performance is used to adjust a set of parameters associated with a machine-learning model configured to control the multi-axis electromagnet. The method further includes generating, using the machine-learning model, based at least in part on the position information of the magnetic microdevice and the first set of sinusoidal current signals, a second set of sinusoidal current signals as inputs for the multi-axis electromagnet.

Aspects of the disclosed subject matter include one or more computer-readable non-transitory storage media embodying instructions for controlling magnetic microdevices in a fluidic environment. As embodied herein, the instructions, when executed by a processor, causes performance of operations comprising receiving, from an imaging device configured to obtain images of a fluidic environment, a plurality of images of the fluidic environment and a magnetic microdevice within the fluidic environment, where the magnetic microdevice is configured to move within the fluidic environment based on a magnetic field, where the magnetic field is generated by a multi-axis electromagnet based on sinusoidal current signals inputted to the multi-axis electromagnet. The instructions, when executed by the processor, causes performance of operations further comprising determining, based on the plurality of images, a state of the magnetic microdevice, the state comprising position information of the magnetic microdevice. The instructions, when executed by the processor, causes performance of operations further comprising calculating, based at least in part on the position information of the magnetic microdevice, a measure of performance associated with a first set of sinusoidal current signals previously inputted to the multi-axis electromagnet, where the calculated measure of performance is used to adjust a set of parameters associated with a machine-learning model configured to control the multi-axis electromagnet. The instructions, when executed by the processor, causes performance of operations further comprising generating, using the machine-learning model, based at least in part on the position information of the magnetic microdevice and the first set of sinusoidal current signals, a second set of sinusoidal current signals as inputs for the multi-axis electromagnet.

BRIEF DESCRIPTION OF THE DRAWINGS

FIGS. 3A-3I are diagrams and photographs illustrating example hardware for control of magnetic microrobots using reinforcement learning in accordance with the disclosed subject matter.

FIGS. 5A-5H are graphs illustrating example evaluations of the learning performance of the RL agent during multiple training sessions.

FIGS. 6A-6G are graphs illustrating example control policies translated into continuous functions in order to increase performance in accordance with the disclosed subject matter.

DETAILED DESCRIPTION

Reference will now be made in detail to the various exemplary embodiments of the disclosed subject matter, which are illustrated in the accompanying drawings.

The disclosed subject matter provides systems and techniques to control microdevices, including but not limited to microrobots, using machine learning based on deep artificial neural networks. Aspects of the disclosed subject matter provide a control system for a helical magnetic hydrogel microrobot that can use deep reinforcement learning (RL) based on a soft actor-critic (SAC) algorithm to autonomously derive a control policy. The control policy can allow the microrobot to swim through an uncharacterized biomimetic fluidic environment under the control of a time-varying magnetic field generated from a multiple-axis (e.g., three-axis) array of electromagnets. As a result, the microrobot may achieve optimized swimming behaviors when actuated with nonuniform, nonlinear, and time-varying magnetic fields in a physical fluid environment.

Reinforcement learning (RL) can be a biomimetic optimization technique, including those inspired by the adaptive behavior of real-world organisms as they act in their environment, observe the results of their actions, and modulate their behavior in order to achieve improved results. In RL, an agent can observe the state of an environment, and choose actions to perform in the environment to achieve a task specified by a reward signal, which can be typically predefined. The reward signal can be used to teach the agent to perform actions to maximize the expected future rewards, which can enable the agent to learn to perform the task better based on past experience. Deep reinforcement learning (DRL), which can be a coupling of RL algorithms with deep artificial neural networks, can be used in the form of various algorithms for achieving high-performance control of processes. The control policies learned by the agent can recapitulate the behavior of rationally designed controllers based on physical models of helical swimming microrobots. Deep reinforcement learning can be applied to microrobot control to expand the capabilities of the next generation of microrobots.

Figure 1A:
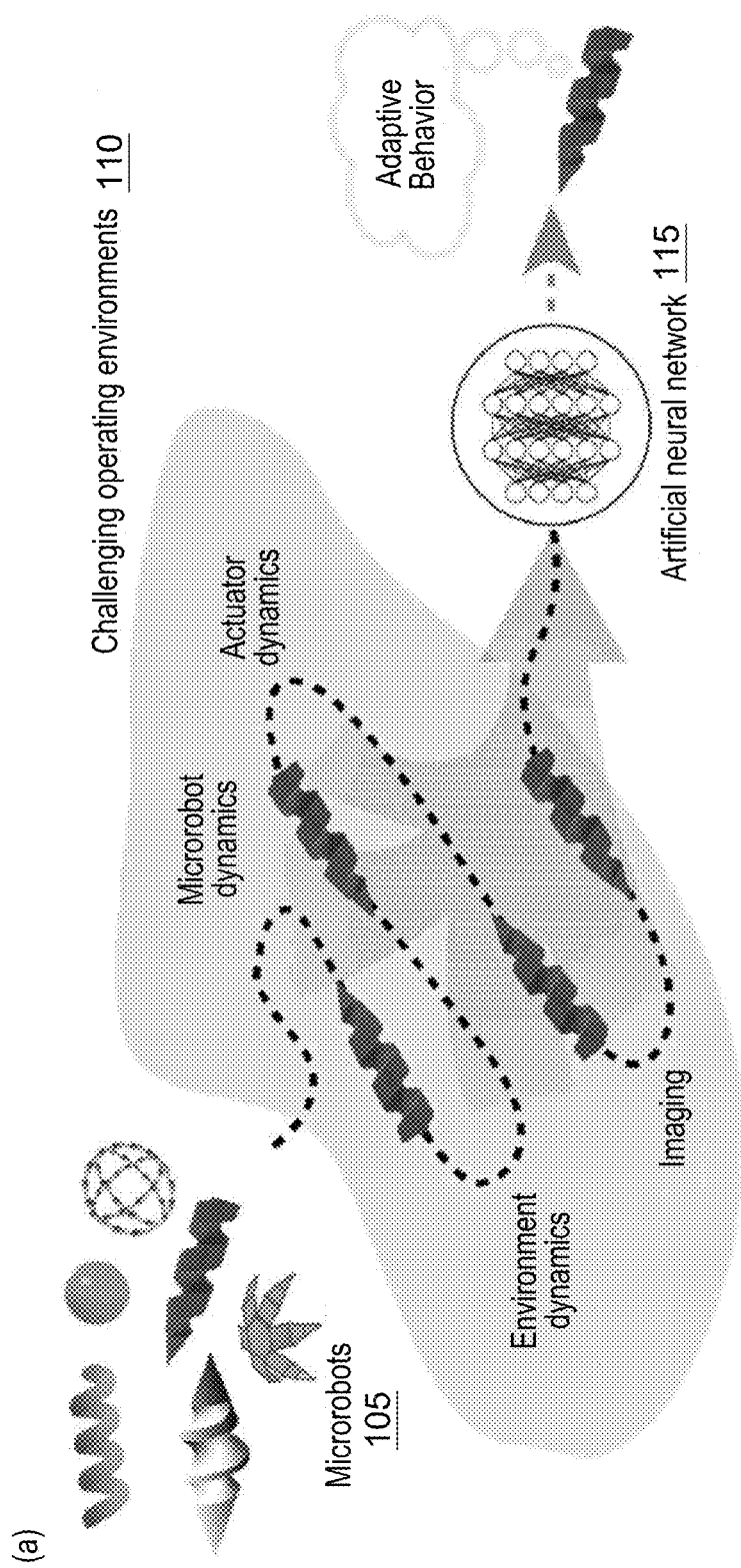
FIGS. 1A-1C are images and diagrams illustrating example techniques for controlling microrobots with unknown dynamics in uncharacterized environments in accordance with the disclosed subject matter.
Figures 1B, 1C:
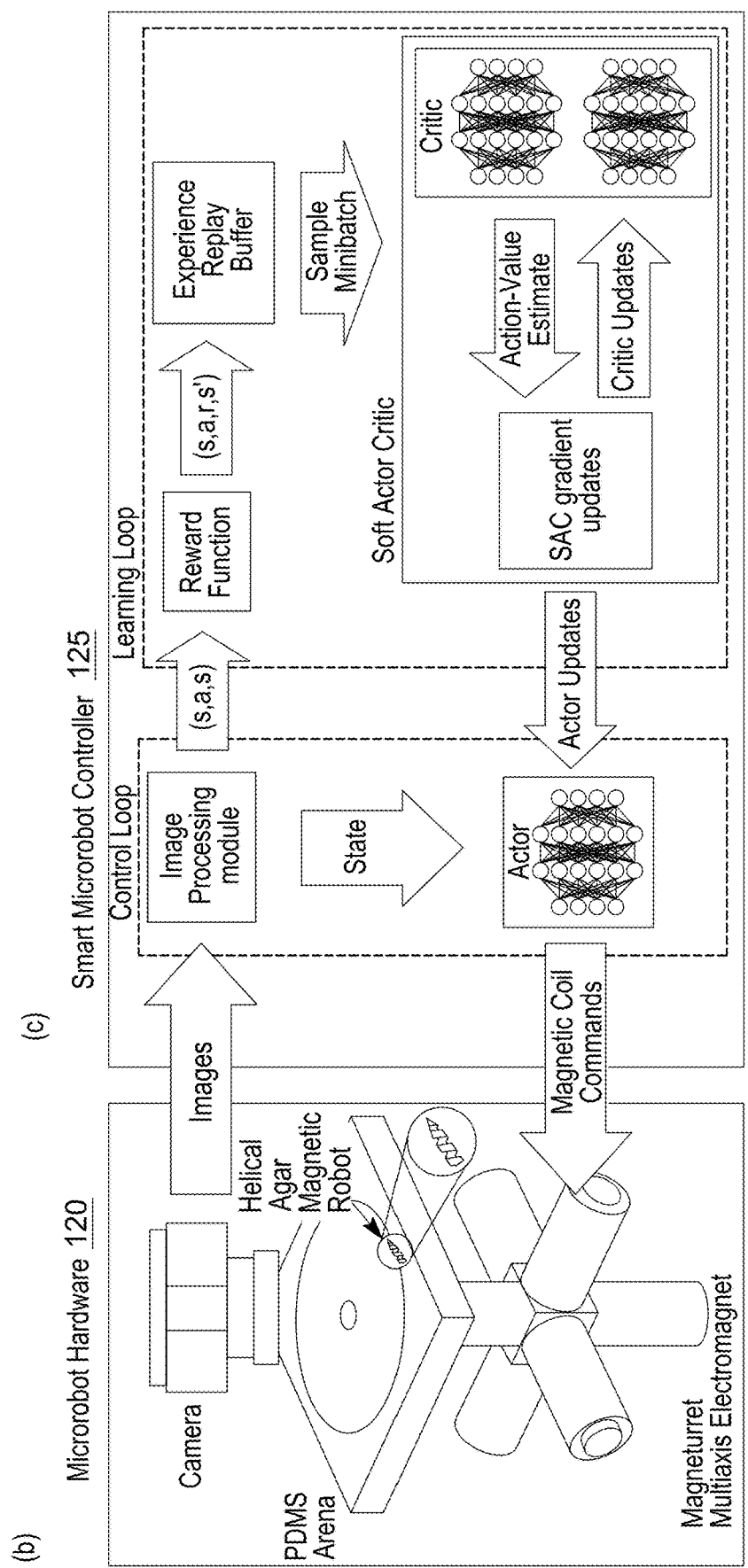

Referring to FIGS. 1A-1C, in certain embodiments, deep reinforcement learning can be used to autonomously develop actuation policies for soft helical magnetic microrobots 105 actuated with non-uniform, nonlinear, and time-varying magnetic fields in a physical fluid environment 110. The disclosed reinforcement learning (RL) agent can learn successful actuation policies both from state variable input and directly from raw images, without any a priori knowledge about the dynamics of the microrobot 105, the electromagnetic actuator, or the environment 110 (FIG. 1A). As shown in FIG. 1A, the disclosed systems can be designed with a great variety of shapes, sizes, materials, and actuation methods. Controllers based on reinforcement learning (RL) based on deep artificial neural networks 115 can factor in all of these complex dynamic systems and inputs to create model-free microrobot controllers.

In certain embodiments, the disclosed RL agent can be configured to discover multiple successful actuation strategies in separate learning trials. The control policies learned by the agent can recapitulate the behavior of optimal physics approaches for actuating helical magnetic microrobots 105. For example, the disclosed reinforcement learning can be used for developing high-performance multi-input, multi-output (MIMO) controllers for microrobots 105 without the need for explicit system modeling. The capability to develop model-free microrobot control algorithms can reduce the time and resources required to develop high-performance microrobot controllers.

In certain embodiments, the disclosed system can include a physical, biomimetic, fluidic arena 110 with multidimensional magnetic actuation. The arena 110 can be used to evaluate the efficacy of the disclosed system. In certain embodiments, the disclosed system can include a helical agar magnetic robot (HAMR) 105. The disclosed system can deploy the helical agar magnetic robot (HAMR) 105 in the arena 110. For example, based on an example microrobot hardware setup 120 as shown in FIG. 1B, a helical agar magnetic robot (HAMR) 105 can be tasked with swimming clockwise through a fluid-filled lumen in a PDMS arena 110 under control of a nonuniform rotating magnetic field generated by a three-axis array of electromagnetic coils (Magneturret). An overhead camera can be used to track the position of the HAMR 105 in the channel. In certain embodiments, a fiducial marker can be placed in the environment 110 in order to create a coordinate reference marker for calculating the microdevice position. The camera can be configured to record video and take images for the state of the HAMR 105 in the fluidic medium. For example, the camera can be set at a long exposure so that the HAMR 105 and the center mark can be the only visible objects in the image. A second identical camera can be placed above the target area (e.g., arena 110) at a slight angle to simultaneously record normal exposure video of the HAMR 105 in the arena 110 during operation, preventing washing out of features in the image. The camera can be used to pass images to a smart microrobot controller 125 comprising an image processing module and a neural network which generate commands for the Magneturret (FIG. 1C). In the control loop, the stream of images from the overhead camera can be processed to generate state information that can be then fed into the actor neural network, which can return a set of continuous actions that can be used to control the currents in the Magneturret. State (s), action (a), reward (r), and next state (s) information can be stored in a replay buffer which can be used to update actor and critic neural networks off policy in a learning loop. The goal of the control system for the remotely actuated microrobot can be to manipulate the shape and magnitude of the actuating energy field in order to move the microrobot to achieve an intended dynamic behavior. The controller neural network can be trained via an RL agent using the SAC algorithm. Although this disclosure describes training an RL agent using a particular algorithm, this disclosure contemplates training the RL agent using any suitable algorithm.

In certain embodiments, the disclosed system can control the currents in the electromagnetic coils in order to create a magnetic field that places forces and torques on the HAMR sufficient to drive its locomotion toward a specific target. Instead of explicitly modeling the dynamics of the magnetic actuator and the HAMR within the environment and specifying a controller, a simpler task of specifying the desired behavior of the HAMR can be used in the form of a reward signal. For example, the agent can observe the state of the environment along with a reward signal containing information about which actions lead towards the successful completion of the task. The RL agent can start without any a priori information about the task and can learn to perform the task by sampling actions from the space of all possible actions and learning which actions resulted in behavior that is rewarded. For example, the disclosed system can use a reward signal as a "reference input" to give the agent information about the desired behavior. The agent then can act in the environment by manipulating the magnetic fields of the Magneturret to move the HAMR. The behavior of the HAMR can be observed by an overhead camera, which can feed state information back to the agent. The RL agent can learn HAMR control policies that can optimize the expected future rewards, which can lead to performance improvement over time.

In certain embodiments, the disclosed system can develop and formulate the task as well as the associated reward signal for the RL controller. For example, at the beginning of each training episode, a target position can be defined (e.g., 20° clockwise from the starting position of the HAMR in the circular channel). The objective of the RL agent can be to develop an action policy π, which can maximize the total value of the rewards it can receive if it follows that policy. When the environment is in the state, s, the agent can choose an action, a, from the policy according to a~π(•|s), probabilistically selecting from a distribution of possible actions available in that state. For example, the disclosed agent can receive a reward when it selects actions that move the HAMR clockwise through the circular lumen towards the target. The disclosed agent can receive a negative reward when it moves the HAMR counterclockwise. If the HAMR 105 reaches the target within the allotted time, the agent can be given a large bonus reward, and the target position is advanced 20°. An example reward function can be r(s, a)=$\Delta\theta_r$+1000 if ($\theta_r=\theta_g$) where $\theta_r$ is the angular position of the HAMR in the channel in degrees, $\theta_g$ is the angular position of the goal, and $\Delta\theta_r$ is the change in angular position of the HAMR as a result of taking action a in state s. In certain embodiments, the reward disclosed herein can encourage the agent to reach the goal as quickly as possible. This two-part reward function can encourage actions that move the HAMR a large distance in the correct direction with each action (optimizing velocity) and direct the agent to end on the target position to receive the bonus reward (providing a terminal condition to end an episode). The agent can receive a positive reward when the HAMR moved clockwise during an action (which can correspond to a negative change in $°_r$ using standard mathematical angle notation). The agent can receive the additional bonus reward for steps in which the position of the robot $\theta_r$ was within 3° of the goal position $\theta_g$.

In certain embodiments, the RL algorithm can be formalized as Markov decision processes, in which, at time t, the state of the system $s_t$ can be observed by the agent. The disclosed agent can perform an action $a_t$ that can change the state of the environment to $s_t'$ yielding a reward $r_t(s_t, a_t)$. This process can continue for the duration of the task, yielding a trajectory of the form ($s_t, a_t, r_t, s_{t+1}, a_{t+1}, r_{t+1}, s_{t+2} \ldots$). In certain embodiments, the RL agent can be configured to identify an optimal policy π*(a|s) for selecting actions based on state observations that maximize the rewards received for following the policy. Over the course of training, the agent can autonomously learn a control policy by trying actions in the environment, observing the reward obtained by performing those actions and modifying its future behavior in order to maximize the expected future return.

In certain embodiments, the RL algorithm can be a soft actor-critic RL agent. The disclosed soft-actor critic can use an actor neural network to define the policy, π, with trainable parameters σ, two critic neural networks to estimate the action-value function, $Q_1$, $Q_2$, parameterized by $\omega_1$, $\omega_2$ and two target critic networks, $Q_{1target}$, $Q_{2target}$, which can be initialized with parameters $\omega_1$, $\omega_2$, and slowly updated with Polyak averaging as the critic networks are updated in order to stabilize the target estimates used to calculate the critic loss function. Soft actor critic learns off-policy by storing transitions in a replay buffer and randomly sampling mini-batches from the replay buffer to perform policy and value function updates.

The disclosed RL algorithm can include specific functions and steps for interfacing the soft actor critic (SAC) algorithm with a physical system. Two separate processes, which run independently of each other, can be used for data collection and neural network training.

The data collection process can use π to select actions while observing the environment, using the most recently updated policy parameters σ. Each action can be taken in the environment for a short period (e.g., a total of 0.9 seconds), and during this time, three sequential observations can be recorded (e.g., 0.3 seconds apart), which can be then concatenated together to a single state observation. Certain transitions collected at each step can be stored in a first-in-first-out (FIFO) replay buffer, which can be shared between the data collection and training processes.

In certain embodiments, concurrent with the data collection process, the training process can sample mini-batches for the replay buffer and update the actor and critic networks with gradient descent. In certain embodiments, the training process can be limited to one gradient step per environmental step in order to prevent overfitting. Periodically, the latest parameters of π can be sent to the data collection process.

Figure 2:
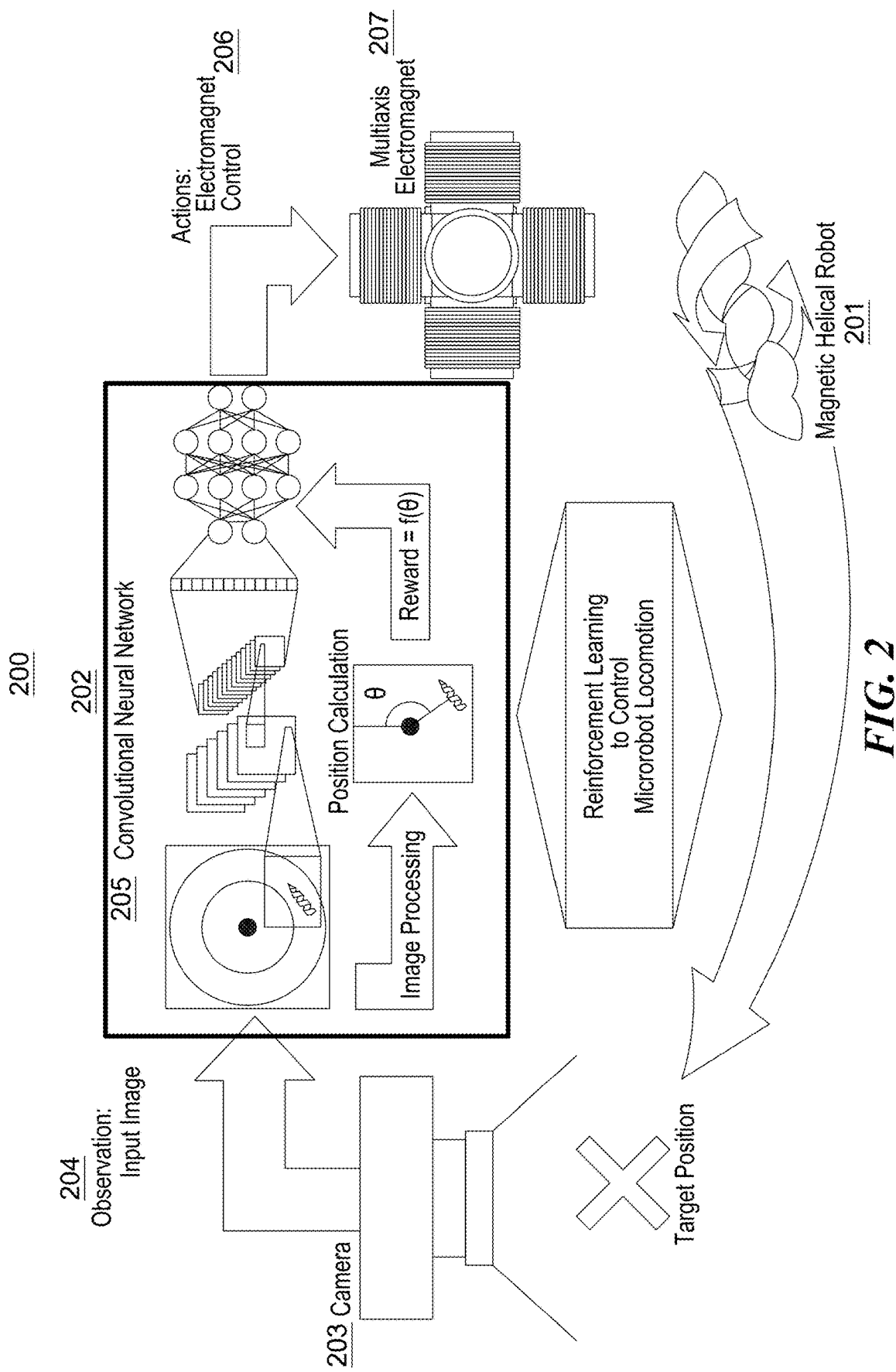
FIG. 2 is a diagram illustrating an example closed-loop control of magnetic helical microrobots based on deep reinforcement learning in accordance with the disclosed subject matter.

In certain embodiments, the disclosed system can provide closed-loop control of magnetic helical microrobots based on deep reinforcement learning. As shown in FIG. 2, the disclosed system 200 can include a helical agar magnetic robot (HAMR) 201 in a circular fluidic track that can be given a specific task (e.g., moving to a target position along the track). In certain embodiments, the task for the RL agent can be to move the HAMR continuously around the circle in a clockwise direction. To complete the feedback control loop, an overhead camera 203 can be used to track the position of the HAMR 201 in the channel. The RL agent, acting as a controller 202, can be configured to receive information about the state of the system as captured by the overhead camera 203 and return electromagnetic control as output. As shown in FIG. 2, the movements of the HAMR 201 can be controlled by the controller 202 (e.g., a deep RL agent), which can capture the state of the system with the overhead camera 203 in order to detect the position of the HAMR 201 in the channel. This state information 204 can then be fed into a neural network 205 that returns a set of continuous actions 206 (e.g., output signals), which can be used to control the currents in a multi-axis electromagnet 207. Magnetic fields can be generated by the electromagnet-induced motion in the HAMR 201. The deep neural network can be trained with reinforcement learning by a reward signal calculated based on the position of the HAMR 201.

Referring still to FIG. 2, in certain embodiments, the control of the disclosed microrobots 201 can be formulated as an episodic, discrete-time control with a continuous action space and continuous state space. The state-space can include all the possible states for the system: the position of the HAMR 201 within the channel, the speed of the HAMR 201, the shape of the magnetic fields, the time remaining in the episode, and the relative position of the robot to the target position in the channel. The action space can include four continuous actions, which control the magnitudes and phase angles for sinusoidal currents in the Magneturret. The current waveforms can take on an infinite number of shapes. In certain embodiments, applied waveforms can be sinusoids because these can be used to generate rotating magnetic fields in other three-axis electromagnetic actuators for microrobots, such as Helmholtz coils. Formulating the control of the disclosed microrobots 201 as episodic, with a time limit and a goal for the robot, can help the microrobot 201 reach the goal position as quickly as possible. While RL tasks can be framed as episodic (with terminal states) or continuous, the embodiments disclosed herein represent the task episodically to recreate the conditions expected to be present in plausible use cases for microrobots 201. The embodiments disclosed herein can include a goal position to represent targets that a microrobot 201 moving in the context of a biomedical application might attempt to reach, such as a blood clot, lesion, or tumor. In certain embodiments, when the HAMR 201 reaches the goal, this can represent the terminal state of the task and a new episode can be started with a new goal position. By creating a virtual moving target for the HAMR 201 during training, the disclosed system can be freed from the having to manually reset the state of the system each time the target was reached, which can facilitate an automated training process.

In certain embodiments, the disclosed system can be configured to utilize entropy regularized deep reinforcement learning for continuous microrobot control. For example, a soft actor-critic RL algorithm (SAC) can be used for continuous microrobot control. SAC can be a maximum entropy RL algorithm that seeks to balance the expected future rewards with the information entropy of the policy. The SAC can learn a policy that successfully completes the task while acting as randomly as possible, which can lead to robust policies that are tolerant of perturbations in environmental conditions. For reinforcement learning with physical systems, SAC can provide high sample efficiency, requiring relatively few environmental interactions in order to develop a successful policy. Sample efficiency is critical in order to reduce wear and tear on the system and in order to minimize the time needed to learn a policy. The SAC algorithm seeks to develop an optimal stochastic policy π*

$$\pi^* = \arg\frac{\max}{\pi} \sum_t \mathbb{E}_{(s_t, a_t) \sim \pi}[r(s_t, a_t) + \alpha \mathcal{H}(\pi(\cdot \mid s_t)]$$

where $\mathcal{H}$ is the information entropy of the policy and $\alpha$ is a temperature hyperparameter, which balances the relative impact of the policy entropy against the expected future rewards.

In the disclosed SAC algorithm, the temperature can be automatically tuned via gradient descent so that the entropy of the policy continually matches a target entropy, $\overline{\mathcal{H}}$, which can be −4 (−Dim of the actions space). The SAC algorithm can use an actor, π, which is a deep neural network that takes the state of the system $s_t$ as input, and returns the action $a_t$ as output. A value function can be created to rate the value of taking actions in certain states and instantiated using two critic neural networks $Q_{1,2}(s, a)$ that take states and actions as input, and return values corresponding to the relative value of taking action $a_t$ in state $s_t$. Two Q networks can be trained in order to reduce overestimation in the value function.

Environmental transitions in the form of (s, a, r, s', d) sets can be recorded in an experience replay buffer, D, where d is a done flag denoting a terminal state, set either when the microrobot has reached the goal or the episode has timed out. In certain embodiments, the experience replay buffer can be a first-in-first-out (FIFO) replay buffer, which can be shared between the data collection and training processes. The SAC algorithm can learn off-policy by randomly sampling mini-batches of past experiences from D, and performing stochastic gradient descent over the minibatch in order to minimize a loss functions for the actor network, π, critic networks, $Q_1$ and $Q_2$ And temperature parameter, α. Over the course of learning, the parameters of the actor and critic neural networks can be updated so that the behavior of the policy approaches the optimum policy, π*. For purpose of illustration and not limitation, Table 1 shows an example algorithm for soft actor-critic for microrobot control. Table 2 shows example neural network architectures and hyperparameters that can be used for the disclosed system.

TABLE 1

Example algorithm for soft actor-critic for microrobot control.

1. Initialize policy parameters σ, Q-function parameters $\omega_1$, $\omega_2$, and empty FIFO replay buffer D
2. Set target Q-function parameters equal to main parameters $\omega_{target,n} \leftarrow \omega_n$
3. Initialize $\overline{\mathcal{H}}$ = −number of actions, α = 1
4. Observe initial state $s_{t=0}$, and calculate $\theta_{robot} \in (0, 360°)$
5. Set $\theta_{goal} \leftarrow \theta_{robot} + 20°$, $\theta_{goal} \in (0, 360°)$
6. Data Collection Process: repeat
7. If new $\pi_\sigma$ is available, update TABLE 1-continued Example algorithm for soft actor-critic for microrobot control.

8. For t steps in range (33)
9. select action $a_t \sim \pi_\sigma$, ($\cdot | s_t$)
10. Execute $a_t$ in the environment
11. For j in range (3)
12. Wait 0.3 seconds
13. Observe next state $s'_j$, reward $r_j(s'_j)$, and done d (1 If $\theta_{robot} = \theta_{goal}$ Or t = 33 Else 0)
14. End For
15. Set $s'_t \leftarrow (s'_{j=1}, s'_{j=2}, s'_{j=3})$, $r_t \leftarrow \Sigma_j r_j$
16. Store transition ($s_t, a_t, r_t, s'_t$, d) in replay buffer D
17. Set $s_t = s'_t$
18. If done: set $\theta_{goal} \leftarrow \theta_{robot} + 20°$, end For
19. End For
20. Set $\theta_{goal} \leftarrow \theta_{robot} + 20°$
21. Training Process: repeat
22. If number of updates < number of transitions in D
23. Randomly sample batch of transitions, B = {(s, a, r, s', d)} from D
24. Compute targets for the Q functions:

$$y(r, s', d) = r + \gamma(1 - d)\left(\min_{i=1,2} Q_{\omega_{target,i}}(s', \tilde{a}') - \alpha \log \pi_\sigma(\tilde{a}'|s')\right),$$
$$\tilde{a} \sim \pi_\sigma(\cdot|s')$$

25. Update Q-functions using $$\nabla_{\omega_i} \frac{1}{|B|} \sum_{(s,a,r,s',d) \in B} (Q_{\omega_i}(s, a) - y(r, s', d))^2$$

for i = 1, 2
26. Update Policy using $$\nabla_\sigma \frac{1}{|B|} \sum_{s \in B} \left(\min_{i=1,2} Q_{\omega_i}(s, \tilde{a}_\sigma(s)) - \alpha \log \pi_\sigma(\tilde{a}_\sigma(s)|s)\right), \tilde{a}_\sigma \sim \pi_\sigma(\cdot|s)$$

27. Update temperature α using $$\nabla_\sigma \frac{1}{|B|} \sum_{s \in B} \left(-\alpha \log \pi_\sigma(a|s - a\overline{\mathcal{H}}\right), \tilde{a}_\sigma \sim \pi_\sigma(\cdot|s)$$

28. Update the target Q-functions using $$\omega_{target,n} \leftarrow \omega_{target,n} + (1 - \tau)\omega_n,$$

for n = 1, 2
29. End If
30. Send latest $\pi_\sigma$ to data collection process every minute
31. Until convergence

TABLE 2

Example network architectures and hyperparameters.

State actor network architecture:

Input Shape: (7, 3)
Dense layer with 256 neurons. Activation: Relu Dropout (0.2)
Dense layer with 256 neurons. Activation: Relu Dropout(0.2)
Output shape: (4)
State critic network architecture:

State Input Shape: (7, 3)
Dense layer with 16 neurons, activation: Relu Action Input Shape: (4)
Dense layer with 16 neurons, activation: Relu Concatenate Sate and Action
Input Dense layer with 256 neurons. Activation: Relu Dropout (0.2)
Dense layer with 256 neurons. Activation: Relu Dropout(0.2)
Output shape: (1)
Convolutional actor network architecture:

Input Shape: (64, 64, 3)
2D convolutional layer, 16 filters, 3 × 3 kernel, activation: Relu
Max pooling(2, 2)

TABLE 2-continued

Example network architectures and hyperparameters.

2D convolutional layer, 32 filters, 3 × 3 kernel, activation: Relu
Max pooling(2, 2)
2D convolutional layer, 64 filters, 3 × 3 kernel, activation: Relu
Max pooling(2, 2)
Flatten Dense layer with 64 neurons. Activation: Relu Dense layer with 256 neurons. Activation: Relu Dropout (0.2)
Dense layer with 256 neurons. Activation: Relu Dropout(0.2)
Output shape: (4)
Convolutional critic network architecture:

State Input Shape: (64, 64, 3)
2D convolutional layer, 16 filters, 3 × 3 kernel, activation: Relu
Max pooling(2, 2)
2D convolutional layer, 32 filters, 3 × 3 kernel, activation: Relu
Max pooling(2, 2)
2D convolutional layer, 64 filters, 3 × 3 kernel, activation: Relu
Max pooling(2, 2)
Flatten Dense layer with 64 neurons. Activation: Relu Action Input Shape (4)
Dense layer with 16 neurons, activation: Relu Concatenate Sate and Action
Inputs Dense layer with 256 neurons. Activation: Relu Dropout (0.2)
Dense layer with 256 neurons. Activation: Relu Dropout(0.2)
Output shape: (4)
Experience replay buffer size: 100,000

Batch size: 256
Learning rate: 0.0003
Gamma: 0.99
Tau: 0.005
Target Entropy: −4
Policy update frequency: 1 minute
Number of Actions: 4
Total step duration: 0.9 seconds (three concatenated observations spaced 0.3 seconds apart)
Goal distance: 20 degrees
Episode length:33 steps
Maximum gradient update steps per environmental step: 1

In certain embodiments, the disclosed electromagnetic coils can create magnetic fields for controlling the magnetic microrobots. The magnetic fields can act on a magnetic microrobot by imparting forces and torques on the robot. For a microrobot with a magnetic moment, m, in a magnetic field, B, the robot experiences a force F according to F=∇(m·B). In a non-uniform magnetic field (i.e., a magnetic field with a spatial gradient), a ferromagnetic or paramagnetic microrobot feels a force in the direction of increasing the magnetic field gradient. The magnetic microrobot can be configured to experience a torque according to τ=m×B, which acts to align the magnetic moment of the microrobot with the direction of the magnetic field. When the magnetic field is rotated so that the direction of B is constantly changing, it is possible to use this torque to impart spin to the microrobot at the frequency of the rotating magnetic field, up to the step-out frequency of the robot. If the spinning microrobot is helically shaped, rotation can be transduced into forwarding motion so that the microrobot swims as if propelled by flagella. This non-reciprocal helical swimming can be efficient in low Reynolds number fluidic environments commonly encountered by microrobots. Because of the efficiency of this swimming mode, and because the magnetic torque available to a microrobot decreases more slowly with distance compared to the force, the disclosed magnetic microrobots can be helically shaped.

In certain embodiments, the disclosed system can include a helical agar magnetic robot (HAMR) in a circular microfluidic arena, controlled by a multi-axis electromagnet (Magneturret). The position of the HAMR can be recorded with an overhead camera. The electromagnetic coils were driven by sinusoidal current waveforms defined by their frequency, f, phase angle, φ, and magnitude, M.

Figures 3E, 3F, 3G, 3H:
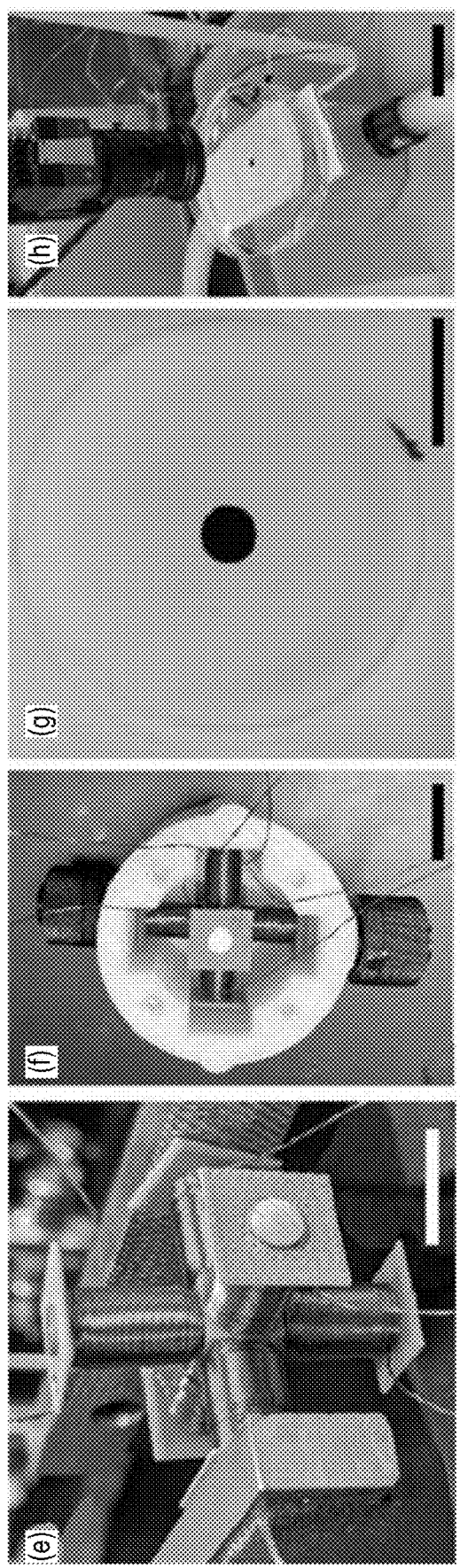

Referring to FIGS. 3A-3I, in certain embodiments, the HAMR can be composed of an agar-based hydrogel (e.g., 2% w/v), which can be uniformly diffused with iron oxide nano-powder (e.g., 10% w/v) to form a magnetically susceptible soft polymer (FIG. 3A). This magnetic agar solution can be heated to melting temperature (e.g., above 80 degrees Celsius) and a syringe can be used to inject the liquid into a helical mold created using a stereolithography 3D printer (FIG. 3B). The agar in the mold can solidify and the robots can be removed with a metal needle and stored long-term in deionized (DI) water. As an example and not by way of limitation, the HAMRs molded for the embodiments disclosed herein can be 4.4 mm in length, 1 mm in diameter, and asymmetrical from head to tail, with a flat head and a pointed tail (FIG. 3C and FIG. 3D). Microrobots formed with this technique have been previously shown to be controllable within rotating magnetic fields, and to perform biomedical functions such as cell delivery and active biofilm removal in the root canal of human teeth. For the embodiments disclosed herein, this HAMR design can have several advantages. The magnetic robots can be further selected based on their morphology and responsiveness to magnetic fields.

In certain embodiments, the HAMRs can be simple to manufacture at low cost with batch fabrication methods. The HAMRs can be small enough to act as helical swimming robots in a flow regime with Reynolds number ≈1 but large enough, about the size of a small grain of rice, to be easily manipulated and visualized without the use of microscopes or other micromanipulation tools. In certain embodiments, the HAMRs can swim with non-reciprocal, helical motion in the presence of a rotating magnetic field. Because the HAMRs can be made of soft hydrogel, they can be flexible and deformable.

In certain embodiments, the disclosed HAMRs can be soft bodied robots that can fit through irregularly shaped channels and enhanced biocompatibility (e.g., by matching the elastic modulus of the biological environment). The disclosed techniques to use reinforcement learning to develop control systems without explicit modeling can be useful for soft microrobots due to this modeling constraint. Despite being soft-bodied, the hydrogel structure of the HAMR can be resistant to noticeable wear over the course of several months of continuous use, thus meeting a practical reinforcement learning constraint that the system not be susceptible to significant wear and tear during extended use.

In certain embodiments, the disclosed HAMRs can be soft bodied robots that can fit through irregularly shaped channels and enhanced biocompatibility (e.g., by matching the elastic modulus of the biological environment). The disclosed techniques to use reinforcement learning to develop control systems without explicit modeling can be useful for soft microrobots due to this modeling constraint. Despite being soft-bodied, the hydrogel structure of the HAMR can be resistant to noticeable wear over the course of several months of continuous use, thus meeting a practical reinforcement learning constraint that the system not be susceptible to significant wear and tear during extended use.

Referring still to FIGS. 3A-3I, the disclosed system can include a Magneturret as an actuator. The Magneturret can be a multi-axis array of electromagnetic coils. For example, the disclosed system can include a three-axis magnetic coil actuator, which can include six permalloy-core magnetic coils (which may be identical) arranged on the faces of a 3D printed Acrylonitrile butadiene styrene (ABS) plastic cube with quick-set epoxy (FIG. 3E). The Magneturret can be constructed by winding 6 identical coils with 400 turns each of 30-gauge magnet wire around a 0.26-inch diameter permalloy core cut to a length of 20 mm. The two coils on opposite sides of the central cube along each axis can be wired together in series so that they both contribute to the generation of a magnetic field along their respective axis. Each of the three coils, hereafter referred to as the X, Y, and Z coils, can be driven with a sinusoidal current generated by a pulse width modulated (PWM) signal created by a microcontroller and amplified in an H-bridge motor driver. The resulting magnetic field, produced by the superposition of the magnetic fields from the three coils, can be modulated by varying the frequency, amplitude, and phase angle of the sine current waves in each coil. The power supply can be used to power the coils. To cool the coils and prevent thermal damage, the Magneturret can be sealed with epoxy resin into a 3D printed housing, and coolant can be continuously pumped through while the coil is operating (FIG. 3F). The RL agent can be given direct control over the magnitude (M) and phase angles (φ) of the sinusoidal driving currents in the X-axis coils ($M_x$, $\varphi_x$) and Y-axis coils ($M_y$, $q_y$) of the Magneturret, for a total of four continuously variable actions: $M_x$, $\varphi_x$, $M_y$, and $\varphi_y$ (Table 3). The Z-axis magnitude can be calculated as the larger of the two magnitudes in X and Y, and the Z-axis phase angle was fixed. The sinusoidal currents in each axis can use a fixed angular frequency of 100 rad s$^{-1}$ (15.9 Hz).

TABLE 3

Control inputs for electromagnet waveforms.

| Magnetic Coil Control Parameters | | | |
|---|---|---|---|
| Control Variable | Symbol | Source | Range |
| Frequency | f | Fixed | 15.9 Hz (ω = 2πf = 100 rad/s) |
| Magnitude X | $M_X$ | RL agent | [−1, 1] unitless |
| Magnitude Y | $M_Y$ | RL agent | [−1, 1] unitless |
| Magnitude Z | $M_Z$ | max($|M_X|$, $|M_Y|$) | [0, 1] unitless |
| Phase Angle X | $\varphi_X$ | RL agent | [0, 2π] radians |
| Phase Angle Y | $\varphi_Y$ | RL agent | [0, 2π] radians |
| Control Equations | | | |
| Current in X-axis coil | | | $I_X = M_X \sin(ft + (\varphi_X))$ |
| Current in Y-axis coil | | | $I_Y = M_Y \sin(ft + (\varphi_Y))$ |
| Current in Z-axis coil | | | $I_Z = M_Z \sin(ft)$ |

Figure 3I:
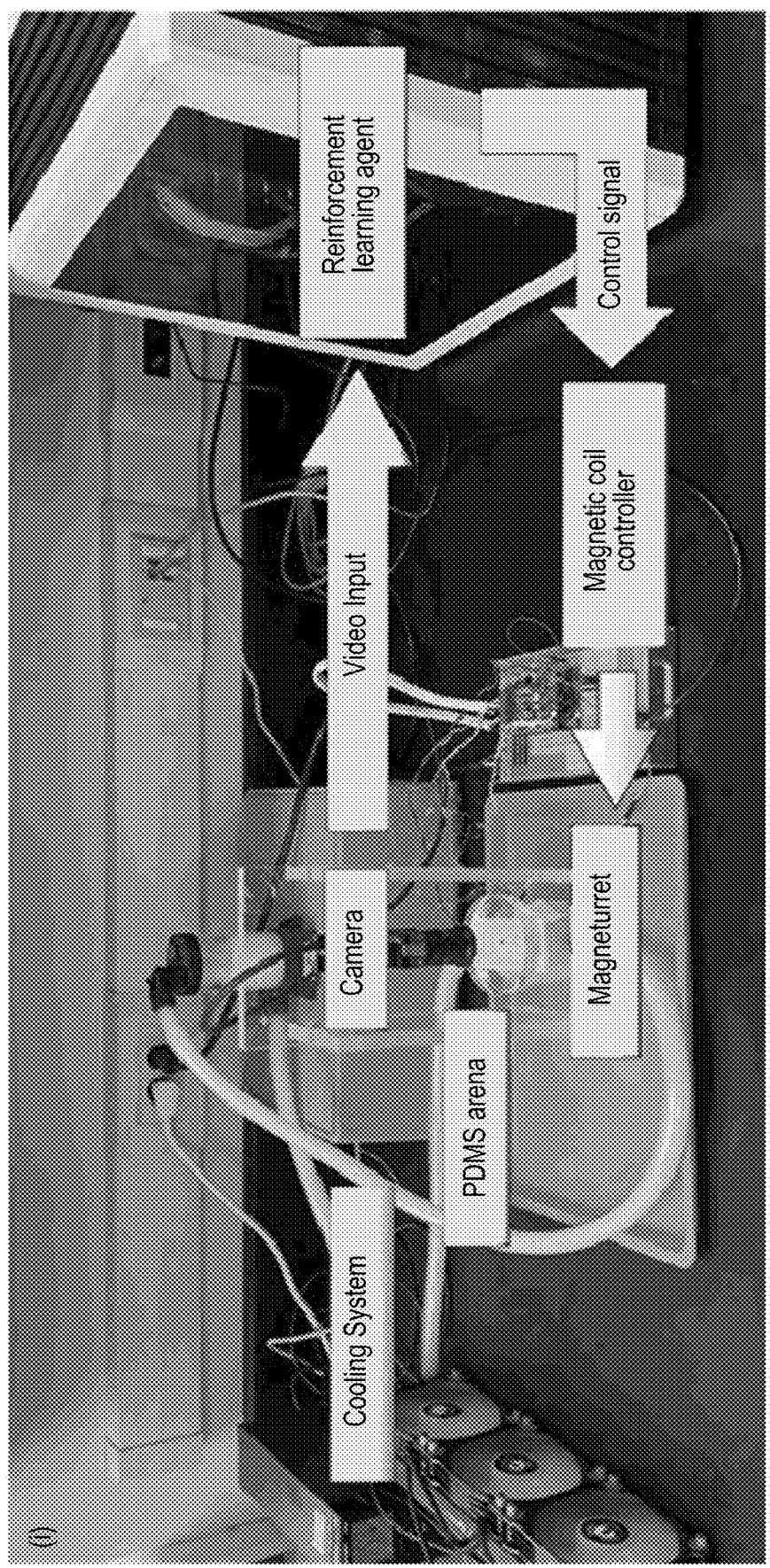

With continued reference to FIGS. 3A-3I, the disclosed system can include an arena for evaluating the operation of the system and training the system. The arena can be a circular, fluid-filled track, which mimics the tortuous in vivo luminal environments that microrobots operating in the body can encounter while providing a simple environment to establish a robust proof-of-concept RL control system (FIG. 3G). In certain embodiments, the HAMR can swim in a complete circle within this arena, and no human intervention is required to reset the position of the robot in the environment during training, which can facilitate automated learning. In certain embodiments, the arena can be constructed by pouring polydimethylsiloxane (PDMS) over a polyvinyl chloride ring with an outer diameter (e.g., 34 mm and a 1.7 mm×3 mm) rectangular cross section. Access holes for the microrobot can be cut, and then the molded PDMS can be plasma bonded to a thin uniform sheet of PDMS to close the channel and then be cured overnight (e.g., at 65° C.). The PDMS can be cured and plasma bonded to a second flat sheet of cured PDMS to form a rectangular lumen for the HAMR to swim. PDMS can be transparent, allowing the clear vision of the robot in the arena to visually track it with an overhead camera. In certain embodiments, the PDMS arena can be submerged in a petri dish filled with DI water in order to prevent the formation of air bubbles in the channel due to evaporation. This petri dish can then be placed on top of the Magneturret, with the center of the Z-axis coil aligned with the center of the circular track (FIG. 3H). A black rubber wafer can be placed into the center of the arena on top of the PDMS to act as a fiducial marker so that the center of the arena can easily be identified with image processing. A diffuse white LED backlight can be positioned between the Magneturret and the PDMS arena for uniform bottom-up illumination, which can facilitate the simple image processing by binary thresholding to identify the position of the microrobot in the channel. FIG. 3I shows an example complete hardware system in accordance with the disclosed subject matter.

Figure 4A:
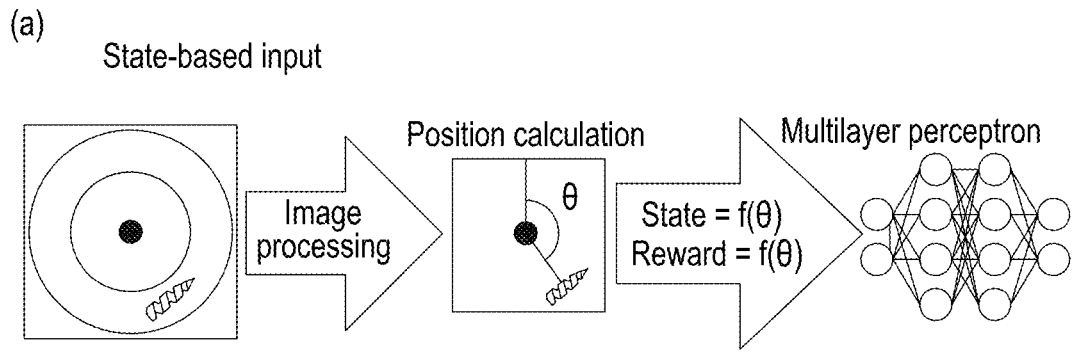
FIGS. 4A-4E are diagrams and images illustrating an example reinforcement learning yielded successful control policies for the HAMR within 100,000 time steps, using both state vectors and images as input in accordance with the disclosed subject matter.
Figure 4B:
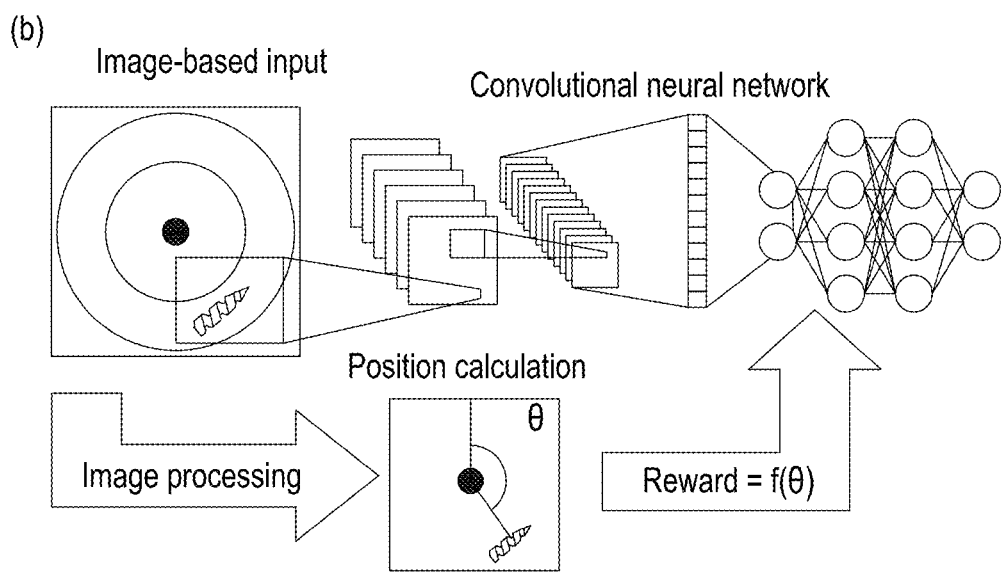

Referring now to FIGS. 4A-4E, the disclosed system can use a reinforcement learning algorithm to learn microrobot control policies. The disclosed system can include the RL agent to learn control policies from either state vector-based inputs (FIG. 4A) or raw images augmented with the goal position (FIG. 4B). In state-based input mode, state information of the disclosed system can be derived by using image processing to create a state vector-based input, which can be passed to the RL agent. The angular position, $\theta_r$, of the microrobot in the channel can be calculated with image processing by binary thresholding and simple morphological operations. The camera can be deliberately run with a slow shutter speed so that the images can be intentionally washed out to remove noise. This can simplify the task of using binary thresholding operations to identify the position of the HAMR and the center of the channel. The angular position of the HAMR in the channel can be measured relative to the fiducial marker in the center of the circular arena. This information, as well as the position of the goal, $\theta_g$, the last action taken by the agent ($M_{x,t-1}$, $M_{y,t-1}$, $\varphi_{x,t-1}$, $\varphi_{y,t-1}$), and the time, t, remaining in the episode can be used to create a state vector. In the second input mode, the agent can be given observations in the form of raw pixel data from the camera. For example, the images from the overhead camera can be scaled down (e.g., to 64×64 pixels), and the images can be augmented with a marker indicating the position of the goal $\theta_g$, as a line radiating outward from the center of the circular track to the goal position in front of the HAMR. These images can be passed into a convolutional neural network, which is a deep neural network architecture that can effectively learn to identify features in images for classification tasks and control robots with raw image input using reinforcement learning.

In certain embodiments, the disclosed reinforcement learning can be based on the mathematics of Markov decision processes. To determine the velocity of the HAMR at any given time, the total state of the system given to the agent at each time step can include three concatenated sub-observations taken 0.3 seconds apart. This can allow the agent to infer the velocity of the HAMR based on differences between the three sub-observations.

Figure 4C:
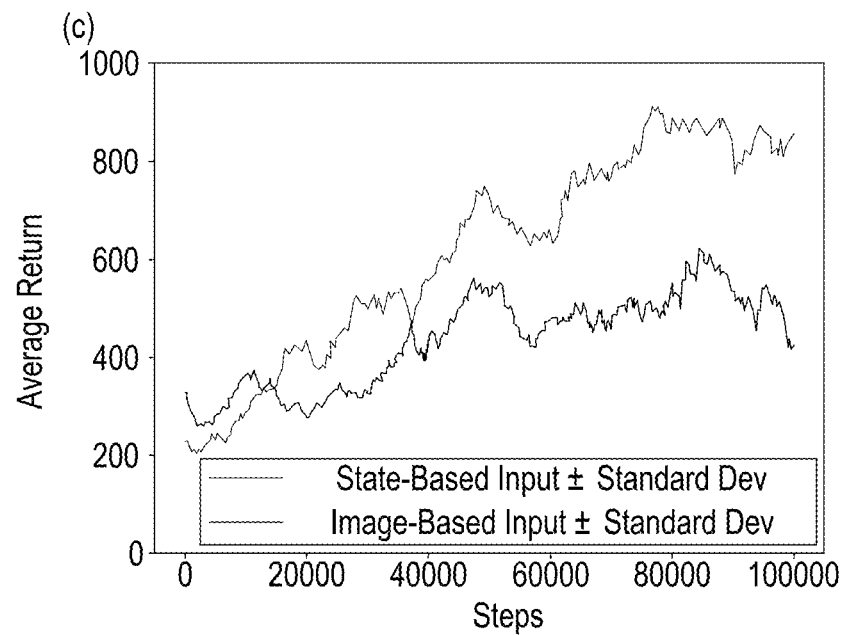
Figure 4D:
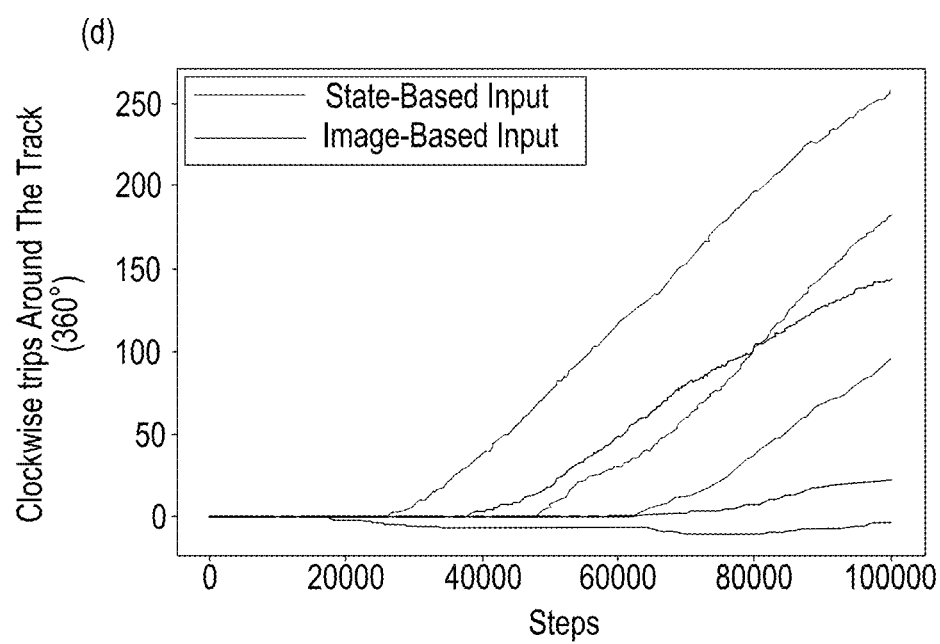

Referring still to FIGS. 4A-4E, at the beginning of each learning trial, the actor and critic neural networks' weight and bias parameters can be randomly initialized. The disclosed neural networks can be trained for a maximum of 100,000 times steps using a fixed ratio of one gradient update per environmental step, which can reduce training speed in exchange for higher training stability. For example, 100,000 environment steps can be adequate time for effective actuation policies to be learned, both with state vector input and raw images (FIG. 4C). In FIG. 4C, traces represent the average and standard deviation of the return from three successful training runs with each input type. The disclosed system can provide improved sample efficiency. As shown in FIG. 4C, the disclosed system can be trained with about 100,000 environment steps, which shows the improved sample efficiency of SAC, compared to certain systems with reinforcement learning that require several million environmental steps to derive a successful policy. The embodiments disclosed herein tracked the net movement of the HAMR during the training process, and each training session ended with the microrobot going continuously around the track in a clockwise direction (FIG. 4D). After 100,000 steps, the disclosed system can achieve the state vector-based policies that can show a high overall level of performance, succeeding in approximately 90% of the episodes compared to the approximately 50% success rate for the image-based input. In certain embodiments, the raw-image-based policies can have benefited from longer training periods.

Figure 4E:
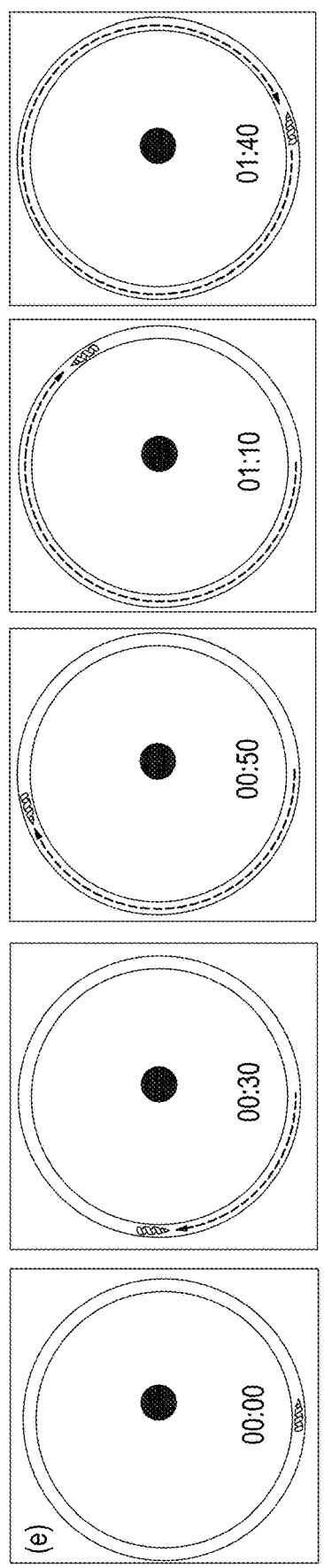
Figure 8:
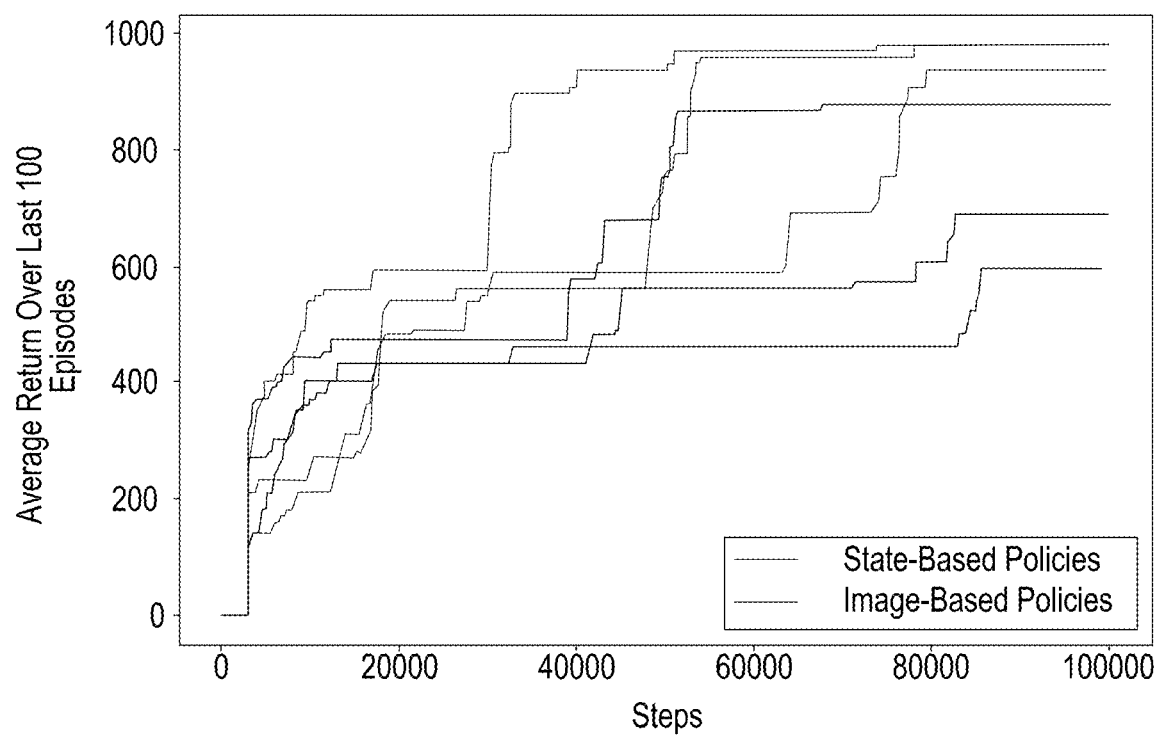
FIG. 8 is a graph illustrating an example selection of the highest performing policy parameters during training in accordance with the disclosed subject matter.

Referring now to FIGS. 4A-4E and FIG. 8, once the training sessions are complete, the disclosed system can evaluate the performance of the learned policies. For evaluating policies, the disclosed system can use the highest performing policy parameters learned during a training session by monitoring a rolling average of the return (e.g., over the last 100 episodes) and saving the policy parameters each time the rolling average performance exceeded the last best performing model (FIG. 8). FIG. 8 shows the results from the three state-based policies and the three image-based policies. In FIG. 8, whenever the average return during the last 100 episodes is higher than at any point previously recorded during training, the parameters (i.e., the weights and biases) of the actor network, $\pi$, were saved. For evaluating the performance of the policy after learning, the highest performing parameters saved during the training session can be used because a drop in performance can happen after the peak performance is achieved in training (possibly due to overfitting). In certain embodiments, early stopping or selecting a policy before performance degradation has occurred can be performed by the disclosed system to prevent overfitting in neural networks. For each input type, policies that resulted in net positive (clockwise) movement from the HAMR can be trained (FIG. 4D). For example, three learning trials can be performed with state vector input, each of which resulted in a policy able to continuously move the robot around the track. In certain embodiments, in order to develop three successful policies using image-based input within 100 k time steps, the disclosed system can increase the number of training sessions. Successful policies can move the robot indefinitely around the complete circular track (FIG. 4E).

Figure 5C:
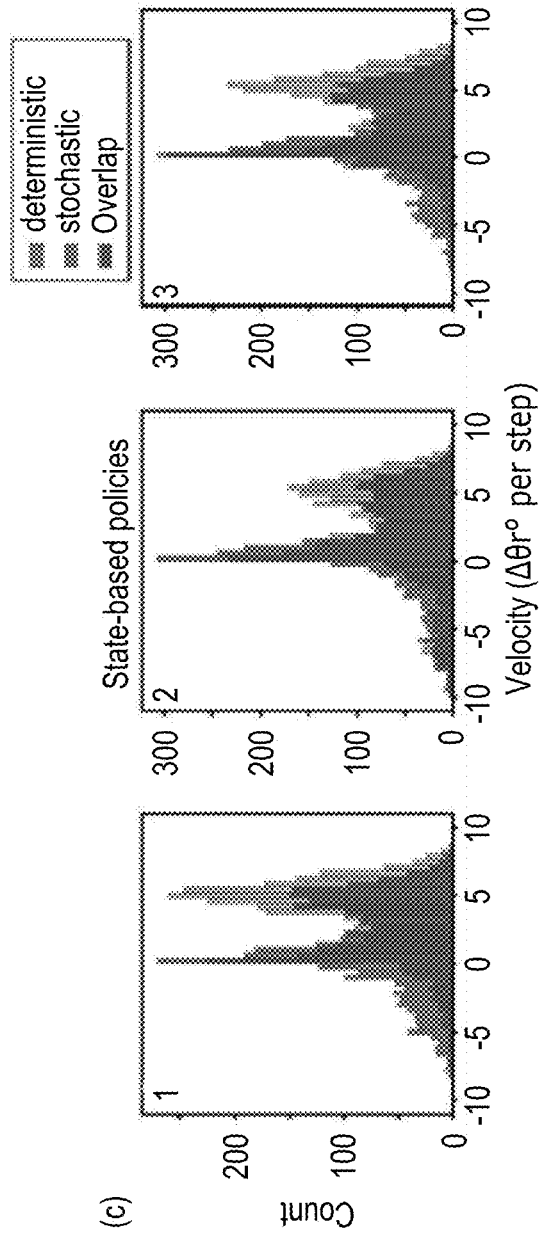

Referring now to FIGS. 5A-5H, the disclosed system can record each action taken by the agent during training sessions and the resultant change in the state of the microrobot. FIG. 5A shows the distribution of actions as a function of the resultant change in HAMR position, $\Delta\theta_r$, for a single training run with state-vector input. In FIG. 5A, the total 100 k steps are separated into 5 bins of 20 k steps each. The distribution of actions over the first 20 k time steps (FIG. 5A, i) is centered around a sharp peak of actions which results in no net movement, as the agent with less experience can randomly explore the space of possible actions. By the second batch of 20 k steps (FIG. 5A, ii), a pattern can emerge in which the action distribution is shifted to a bimodal distribution in which the majority of actions still result in no net movement, but a second peak on the positive side indicates a trend towards selecting actions which result in a clockwise movement. During this phase of training, the net motion of the robot remained close to zero (FIG. 5B), because of the fattening of the negative tail in the action distribution. As the learning process continues, the distribution continues to shift until the average movement is clockwise, with a second peak around 5 degrees per time step and a narrow tail representing few actions, which cause the robot to move in the counterclockwise direction (FIG. 5A.v).

Figure 5D:
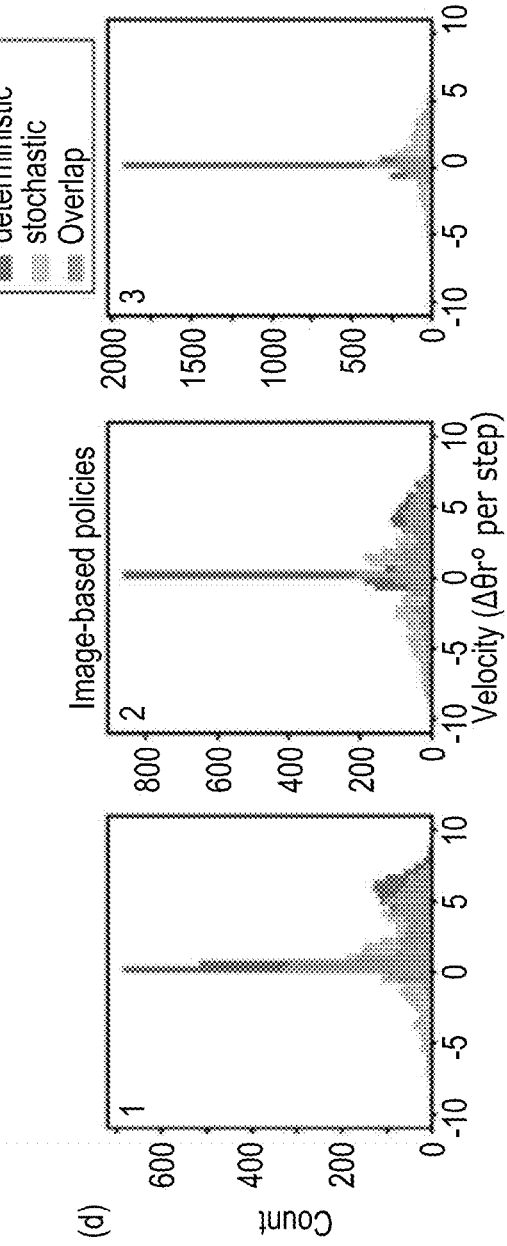
Figure 5E:
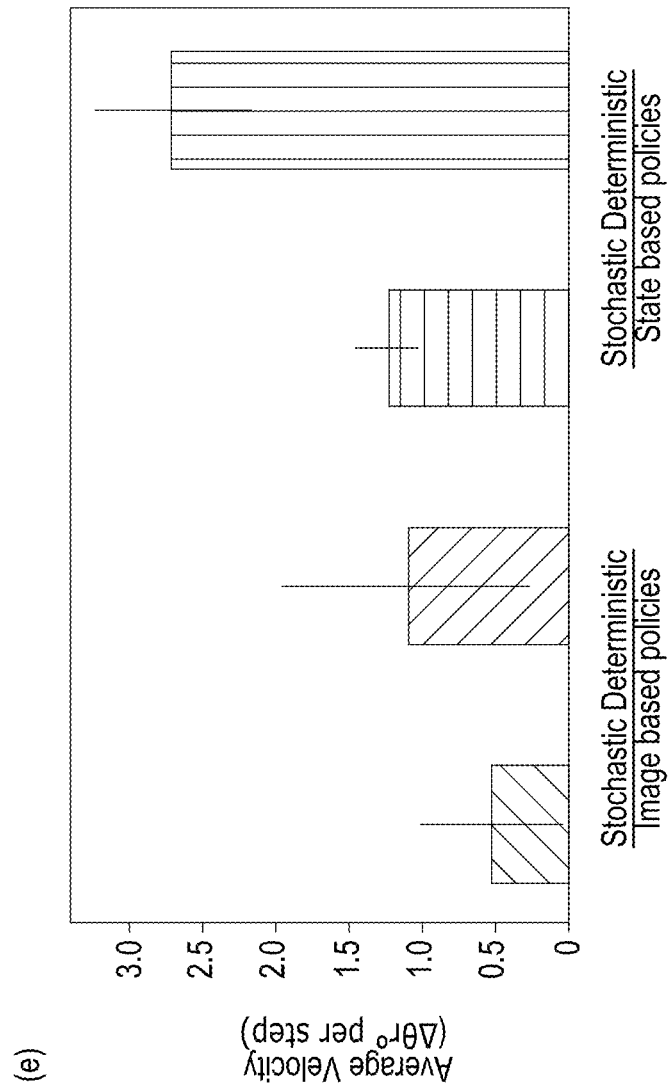

In certain embodiments, the soft actor critic algorithm can learn a continuous stochastic policy, π, sampling actions from the policy according to $a_t \sim \pi(\bullet|s_t)$, in which the actions selected during training are randomly sampled from a Gaussian distribution. The agent can learn the mean μ, and the variance of this distribution over the course of training in order to explore the space of possible actions during training. During training, the agent can seek to balance the sum of future rewards with the information entropy of the policy by maximizing an entropy regularized objective function, and the policy entropy can correspond to the explore/exploit tradeoff the agent makes during training. In certain embodiments, once the policies are trained, performance during policy evaluation can increase by selecting actions from the mean of the distribution without further stochastic exploration according to $a_t = \mu(s_t)$. This deterministic evaluation can lead to an increase in the proportion of actions taken by the agent, which can result in positive motion for both state-based (FIG. 5C) and image-based agents (FIG. 5D). In certain embodiments, the disclosed system can compare the total average velocity achieved by all of the trained policies in both deterministic and stochastic action selection modes. In certain embodiments, the deterministic action selection can cause higher performance for both policy types, and the state-based policies can achieve improved performance than the image-based policies after 100,000 environmental steps (FIG. 5E). This is consistent with the expectation that the reward function used in the embodiments disclosed herein can optimize the agent for velocity, and that removing the additional exploratory behavior of the stochastic agent can manifest as faster swimming.

Figure 5F:
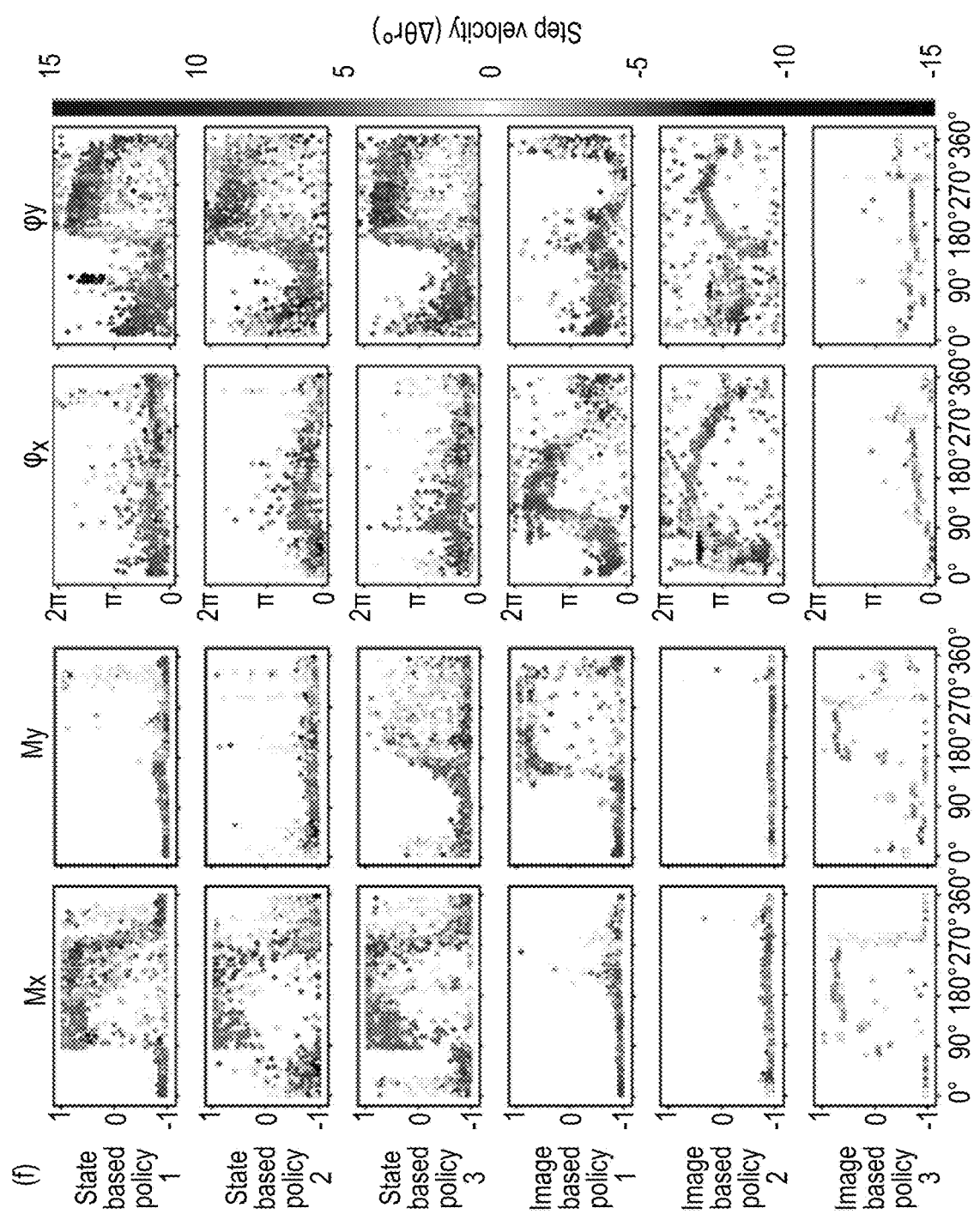

Referring still to FIGS. 5A-5H, the disclosed system can examine the distribution of the action values chosen by the RL agent (e.g., when evaluated deterministically according to $a_t = \mu(s_t)$). For each of the four actions ($M_x$, $M_y$, $\varphi_x$, $\varphi_y$) taken by the policy over 3000-time steps, the value of the action can be plotted against the position of the HAMR, $\theta_r$ (FIG. 5F). The plotted actions can be color-coded according to $\Delta\theta_r$, with red actions indicating positive forward motion and blue actions indicating retrograde motion. The majority of actions taken by each of the six policies during evaluation resulted in positive motion. Each of the three policies trained using state-vector based input can follow similar patterns, in which the phase angle of the X coil can be held constant, and the magnitude of the X coil can vary according to the position of the microrobot $\theta_r$. The Y coil can be controlled by actuating the phase angle as a function of position and holding the magnitude relatively constant. In certain embodiments, the policies learned by the image-based agents can be more heterogeneous, finding different possible ways to manipulate the 4 actions in order to produce forward motion. One pattern that is consistent in all learned policies can be that the magnitudes tend to hold steady close to the maximum or minimum values of −1 and positive 1, regardless of $\theta_r$. This can result in the largest amplitude sine waves because larger magnetic fields can create more powerful torques on the HAMR. The action distribution plotted in FIG. 5F is plotted against the position of the HAMR, which can be the component of the state vector that correlated most strongly with variations in the policy action distribution.

Figure 5G:
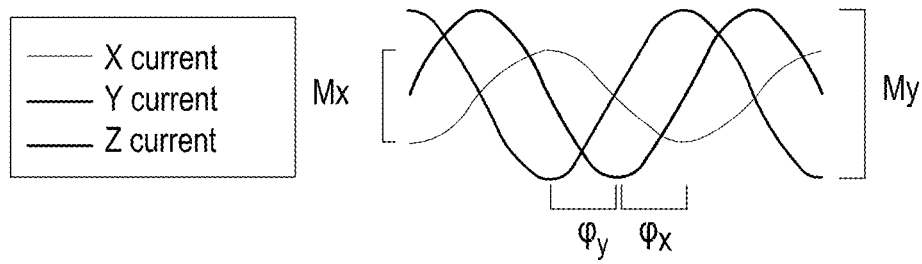
Figure 5H:
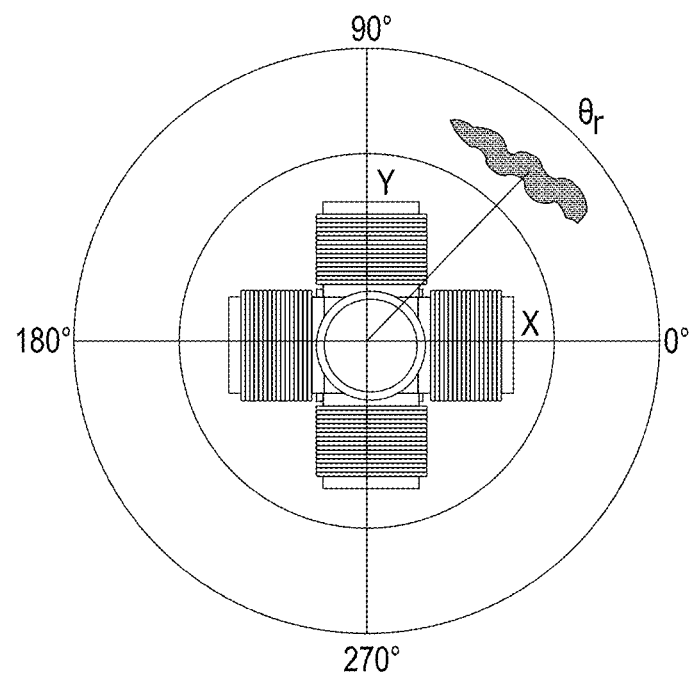

FIG. 5G is a schematic showing of the control parameters for the sine waves used to drive the current in the Magneturret. The RL agent can have control over the magnitude, M, and the phase angle, ω, in the X and Y coils. FIG. 5H is a schematic showing of the angular position $\theta_r$, of the robot in the circular channel.

Figures 6A, 6B, 6C:
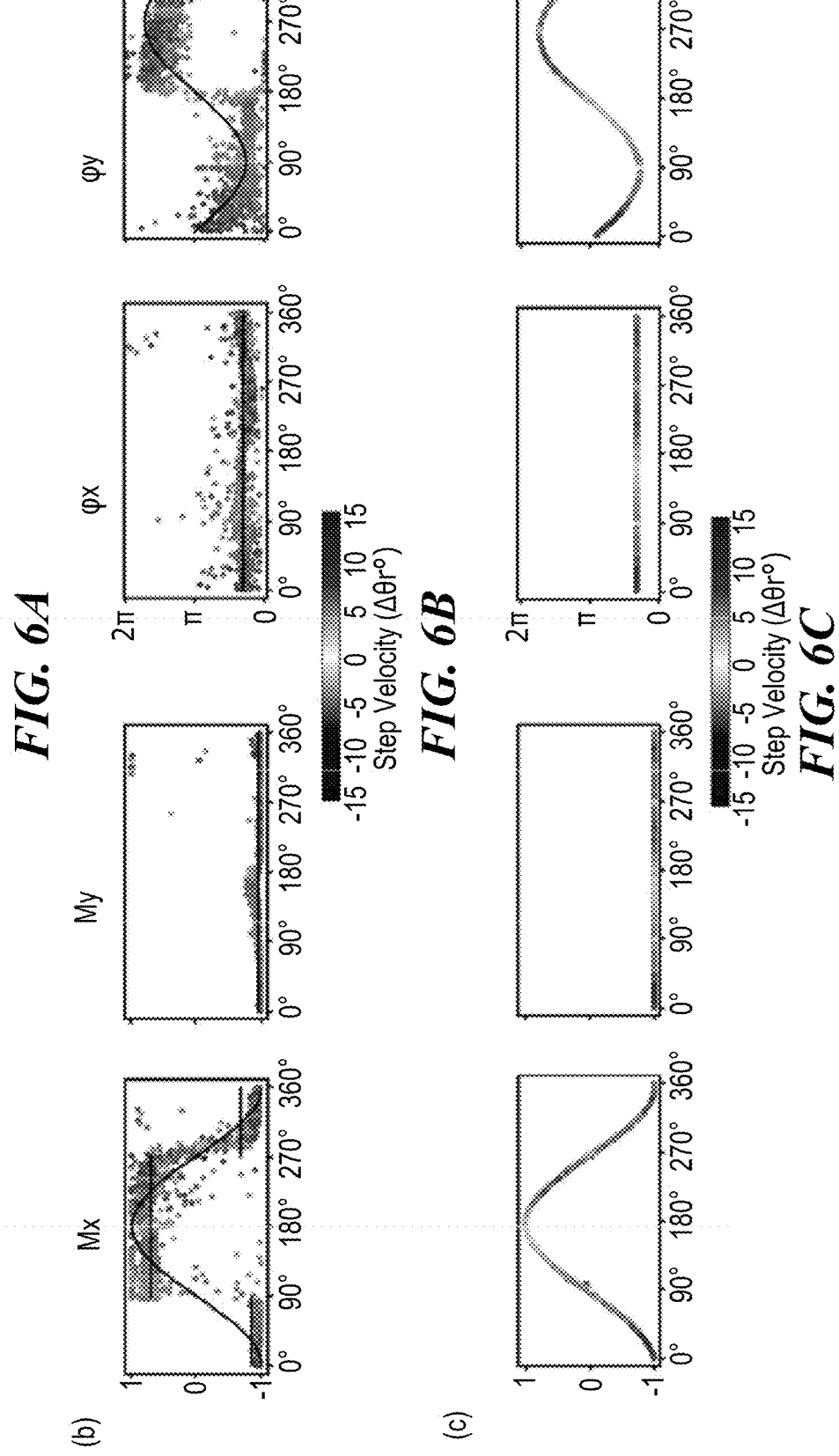
Figure 6G:
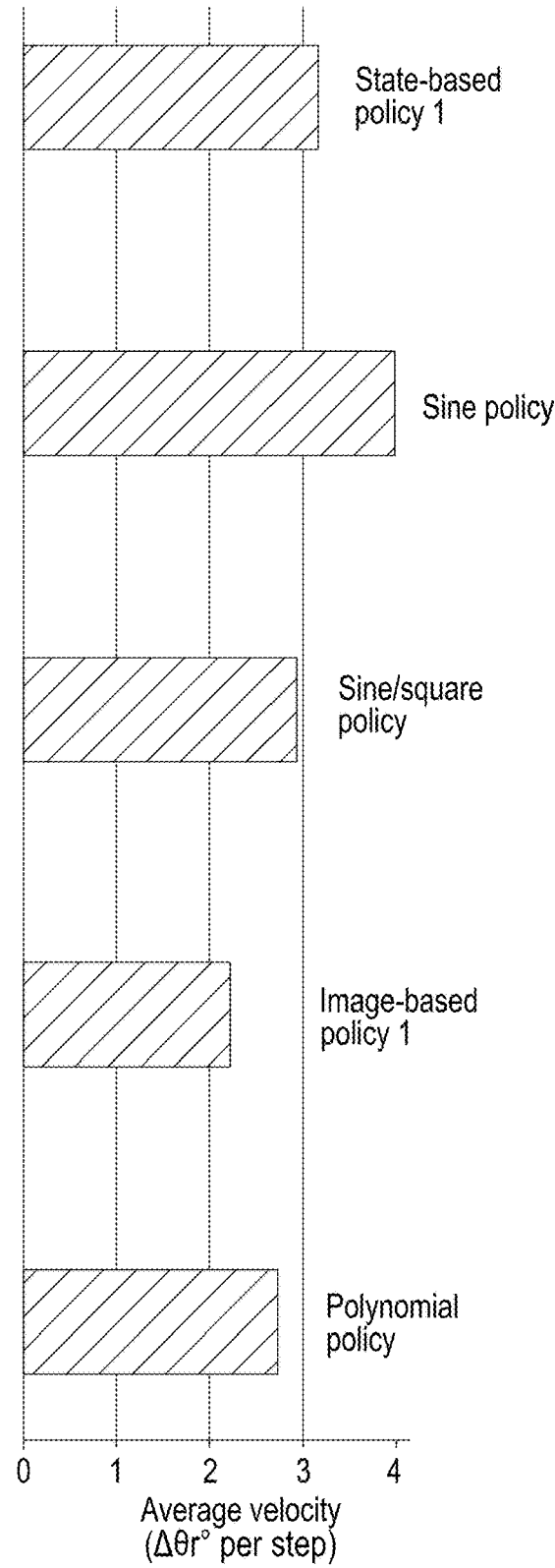

Referring now to FIGS. 6A-6G, the disclosed system can derive mathematical control policies from the RL-trained policies. The policies learned by the RL agent sometimes can perform actions that are not optimal (e.g., resulting in negative motion). To improve the performance of these policies, certain techniques (e.g., hyperparameter tuning and longer training times) can be used for the disclosed system. In certain embodiments, the disclosed system can distill the policies learned by the network into mathematical functions of the state variables to achieve a higher level of performance (FIG. 6A). For example, certain the state-based policies and the image-based policies can be chosen, and regression models can be applied to the data in order to create continuous control signals as a function of the robot position $\theta_r$. First, the embodiments disclosed herein examined policy 1, learned by the state vector-based agent (FIG. 5F). This policy is acting by modulating the magnitude in the X coil in what appears to be a square wave pattern and the phase angle in the Y axis coil in what appears to be closer to a sine wave. The other two actions are held approximately constant regardless of the position of the robot. From all 3000 actions taken during policy evaluation, the subset of actions taken by a policy that can result in a positive velocity (e.g., at least 3°/step) is selected.

In certain embodiments, sinusoidal regression models can be then fit to the $M_x$ and $\emptyset_y$ action distributions, and a square wave can be fit to $M_x$ (FIG. 6B). The resulting policies are shown in FIG. 6B as solid black lines superimposed over the action distribution. The sine wave policy (FIG. 6C) and the mixed sine/square wave policy (FIG. 6D) developed with the regression models can be then used to control the HAMR. The image-based policy evaluated can be more complex than the state-based policy (FIG. 6E). This policy can be modeled mathematically by fitting a 20th order polynomial to the data, and this polynomial policy can be used to drive the HAMR (FIG. 6F).

In certain embodiments, the sinusoidal policy can achieve the highest level of performance (FIG. 6G), achieving the highest average HAMR velocity of all policies, while the square/sine policy can perform slightly slower than the neural network policy on which it is based. Despite the complexity of the polynomial policy compared to the sine and square wave-based policies, the performance of this policy can be approximately equal to that of the sine/square wave policy and be superior to the neural network-based policy on which it is based (FIG. 6F). Since these mathematical policies only use $\theta_r$ as the input, the performance of mathematically inferred policies can increase by taking other parts of the state vector into account.

Figure 7A:
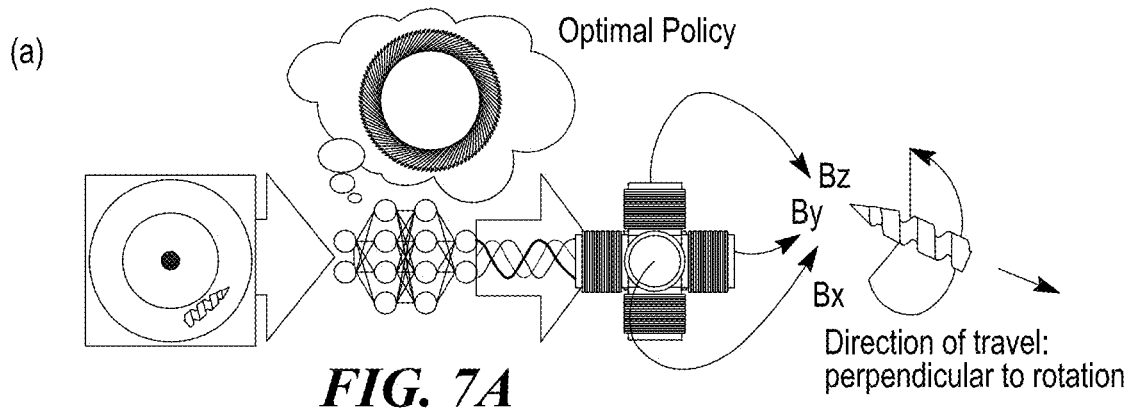
FIGS. 7A-7D are graphs illustrating example control policies learned by the RL agent that can recapitulate the behavior of optimal policies based on theoretical physical models in accordance with the disclosed subject matter.
Figure 7B:
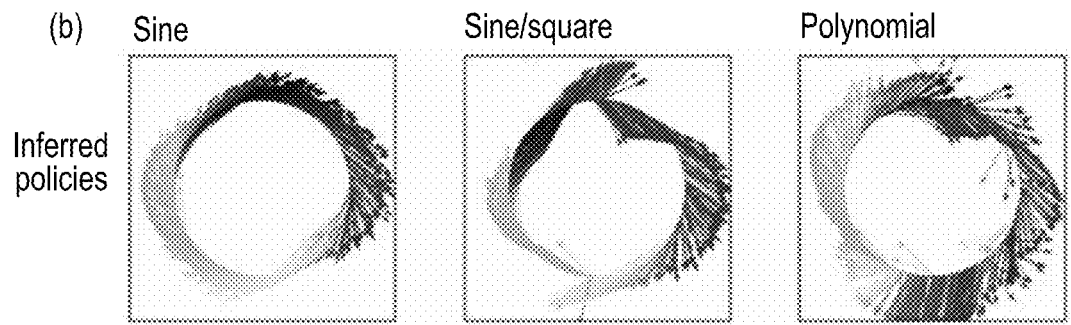
Figure 7C:
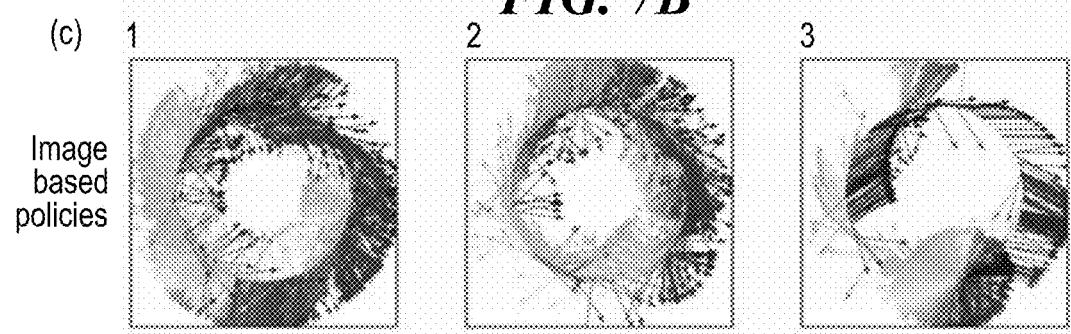

Referring now to FIGS. 7A-7D, the control policies learned by the RL agent can recapitulate the behavior of optimal policies based on physical models. The policies learned by the RL agent can modulate the magnetic field in a way that matches with the control systems developed based on physical models by a user. When using a uniform rotating magnetic field to steer a helical microrobot, the rotating magnetic field can rotate about the helical axis of the microrobot, which is also the direction in which the microrobot can swim (FIG. 7A). Therefore, to drive a helical microrobot around a circular track, the direction of the rotating magnetic field can be tangent to the circular track at all points along the circle for the optimal policy (FIG. 7A).

Figure 7D:
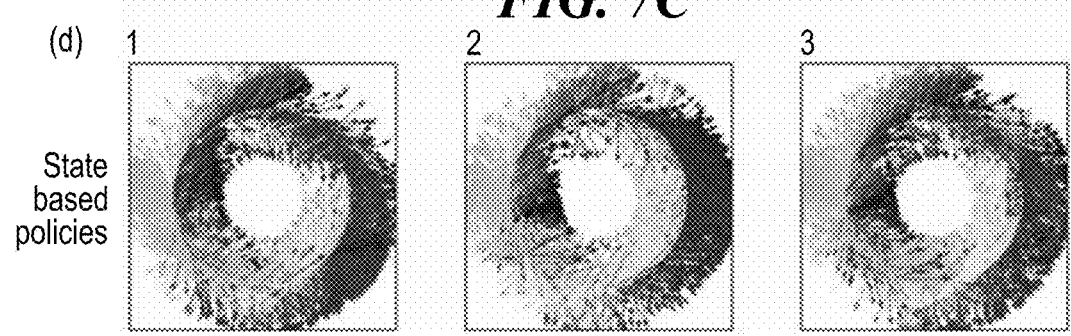

Referring still to FIGS. 7A-7D, the recorded actions selected by the policy while driving the HAMR around the track can be used to estimate the magnetic fields produced during the action. For example, a three-dimensional vector can be constructed: e.g., $B=[B_x, B_y, B_z]$, where $B_n=M_n \sin(ft+\varphi_n)$, where the magnitude and phase angle were selected by the policy. The actions taken by the agent can be run (e.g., for a total of 0.9 seconds) during each time step, during which time the actions can be held constant and B can rotate as a function of time with an angular frequency of 100 rad/s. Taking the cross product $B_\perp=B(t)\times B(t+1)$ results in a vector $B_\perp$ which points in the direction perpendicular to the plane of the rotating magnetic field (FIG. 7A). Magnetic helical microrobots can swim with propeller-like motion, transducing magnetic field rotation into torque, torque into angular velocity, and angular velocity into linear velocity in the direction of travel. The policy for controlling a magnetic helical microrobot can create a rotating magnetic field perpendicular to the direction of travel of the robot at each point in the circle, so that the microrobot moves tangent to the circle at all points along the track. In FIG. 7A, vectors are color-coded according to their azimuthal angle. By calculating the azimuthal angle $\theta_{B\perp}=\arctan(B_{\perp y}/B_{\perp x})$, the direction of the rotating magnetic field during an action taken by the policy can be estimated. Results can be shown for the inferred mathematical policies (FIG. 7B), the image-trained policies (FIG. 7C), and the state-trained policies (FIG. 7D). The results can be shown by plotting an arrow with the direction $\theta_{B\perp}$ at the point $\theta_r$ along the circular track for each action taken by the policy. Each policy learned by the RL agent, regardless of input type, can create a rotating magnetic field nearly perpendicular to the direction of travel of the microrobot, recapitulating the behavior of the theoretical optimal policy that is based on a physical analysis of helical swimming magnetic microrobots.

The disclosed subject matter provides a closed-loop control system for magnetic helical microrobots. The disclosed system can utilize reinforcement learning to discover control policies without the need for any dynamic system modeling. Continuous control policies for high-dimensional action spaces can be represented by deep neural networks for effective control of magnetic fields to actuate a helical microrobot within a fluid-filled lumen. High-dimensional inputs, including state-vector inputs and raw images, can be sufficient to represent the state of the microrobot. Compared with other control systems for magnetic microrobots, the disclosed system can provide a number of key advantages. For example, electromagnetic actuation systems for microrobots can be either air core or contain soft magnetic materials in the core, which enhance the strength of the generated magnetic field. These systems can lead to nonlinearities when summing the combined effect of fields from multiple coils. Nonlinearities can make modeling the behavior of the system more difficult when the coils are run with high enough power to magnetically saturate the core material. Additionally, when controlling microrobots with permanent magnets, those magnets modeled as dipole sources for simplicity can have the actual behavior of the physical system that does not match the idealized model behavior. The disclosed neural network-based controllers trained with RL learn control policies from observing the actual behavior of the physical system, and deep neural networks can accurately model non-linear functions. The disclosed control policies learned with RL can automatically take into account the real system dynamics, and this model-free control approach can simplify the control process.

The disclosed system can control a soft helical microrobot without any dynamic modeling on the part of the control system designers. RL-based microrobot control can allow the RL agent to do the work of developing a high-performance controller. RL-based controllers can exceed the performance of conventional control systems based on simplified models (e.g., linearized models) because the RL agent can learn based on the observed physical behavior of the system, and deep neural networks can accurately model any observed nonlinearities that the micro-robotic system may exhibit.

In many robotic applications, training physical robots with RL can be impractical for many conventional systems due to the constraints imposed by the physical system or the task, particularly when safety is critical and exploration is costly. This can make it difficult to amass a sufficient quantity of training data to train a high-performance system. To address the aforementioned limitation, in certain embodiments, the disclosed system can scale up real-world learning time by multiplexing robot training with many concurrently learning robots performing the same task.

Highly complex microrobots, which exhibit significant kinematic complexity and deformability, can be infeasible to train purely with conventional model-free approaches because of the additional time it may require to train the conventional systems to fully explore the state space. To address the aforementioned limitation, in certain embodiments, the disclosed system may utilize transfer learning, in which a simulation of the physical system can be used to amass a large quantity of training data in silico, and then the final control system can be fine-tuned with training on the physical system.

In certain embodiments, the disclosed system may further enhance RL by utilizing other control strategies for microrobot control. For example, the disclosed system can combine RL with algorithms which have been used to control soft microrobots such as force-current mapping with PID control and path planning algorithms in order to optimize the gains in the PID controllers, and adapt to changes in environmental conditions by a process of continuous learning, or to optimize for multiple variables. Force-current mapping algorithms used to control microrobots may be created with assumptions of linearity in magnetic field superposition, which can be violated with soft magnetic cores in the driving coils. To address the limitation of force-current mapping algorithms, the disclosed system can utilize the nonlinear function approximation capabilities of deep neural networks. In certain embodiments, the disclosed system can combine RL with classical control. Using such methods, the disclosed system can improve models of microrobot dynamics by fine-tuning their parameters based on a data-driven RL approach, leading to increased performance.

In certain embodiments, the disclosed system can learn microrobot control policies with RL based on no prior knowledge, and then fine-tune the performance of the policy by fitting continuous mathematical functions to the learned policy behaviors. The disclosed deep neural network trained to control microrobots with RL can arrive at policies that are unintuitive and uncover useful behaviors that would not be suspected or created by human engineers. Furthermore, the RL agent can reliably develop near-optimal behavior, which can match the behavior of a rationally designed controller. If RL is applied to a more complex micro-robotic system for which no good models of optimal behavior are available, the RL agent can autonomously identify the best way to control the system. This ability to detect subtle patterns from high-dimensional data in a model-free RL approach can lead to state-of-the-art control policies that exceed the performance of human-designed policies.

The disclosed RL agent can learn successful policies from both state vector input and from raw camera images. With this input flexibility, the disclosed RL can be applicable for a broad class of biomedical imaging modes in which the state of the system can be represented by MRI, X-ray, ultrasound, or other biomedical imaging methods. Using higher dimension input like images can allow encoding of richer policies, which can respond to objects in the field of view that are not observable from lower dimensional feedback available in a state vector representation. In complex environments in which environmental factors such as lumen shape, fluid flow profiles, surface interactions, and biological interactions are likely to be significant factors, the ability of the disclosed subject matter to use machine vision for state representation can improve microrobot performance. In certain embodiments, the disclosed system can further use an image-based input to an RL control system, which can also help observe and control more kinematically complex microrobots by encoding the configuration of the robot in the state representation.

Figure 9:
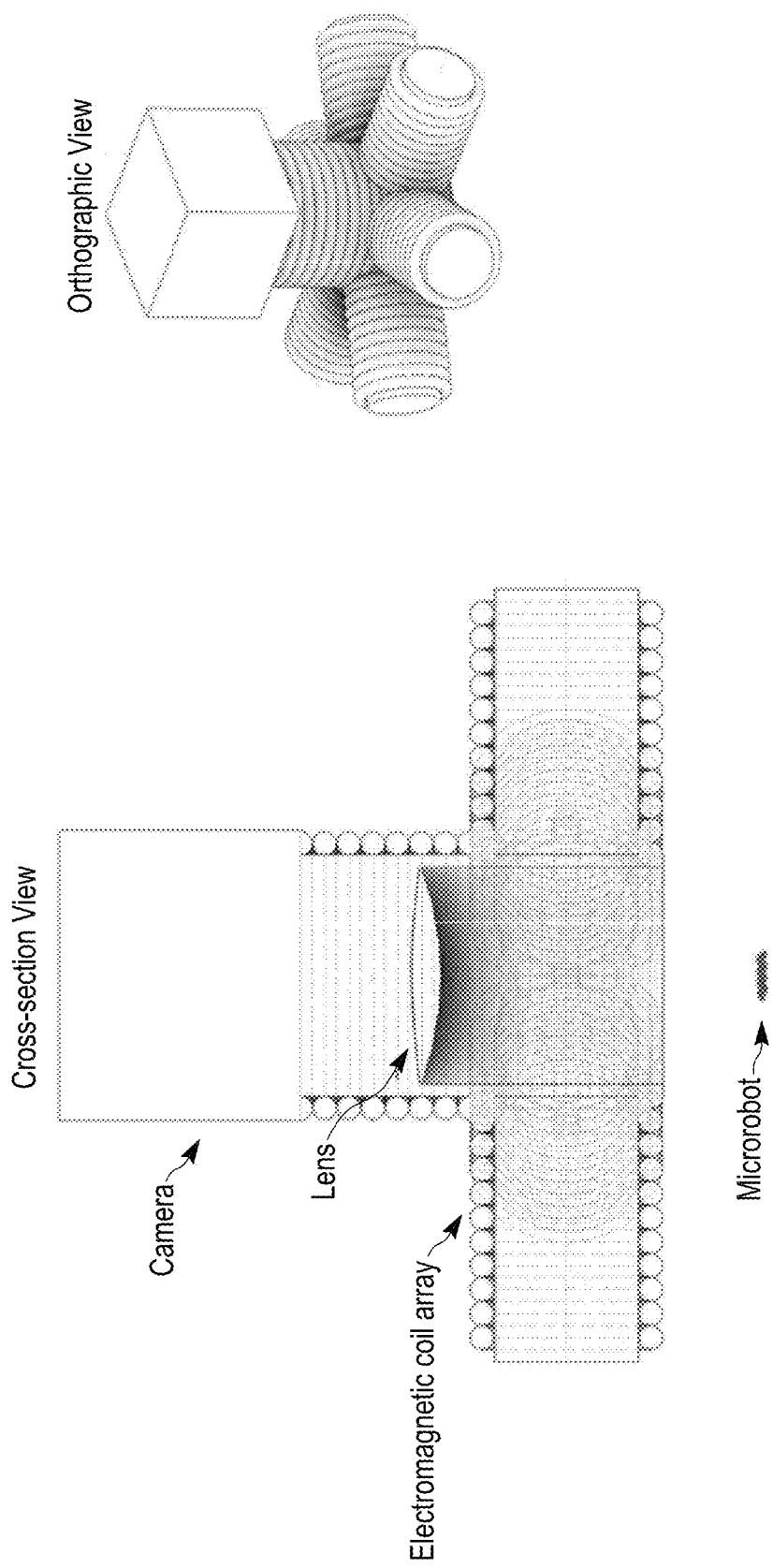
FIG. 9 is a diagram illustrating an example handheld device for simultaneous imaging and magnetic actuation in accordance with the disclosed subject matter.

FIG. 9 is a diagram illustrating an alternative embodiment of a handheld device for simultaneous imaging and magnetic actuation in accordance with the disclosed subject matter. As shown in FIG. 9, the handheld device can include a camera and a lens to image the microrobot in a fluidic medium, and an electromagnetic coil array to control movement of the microrobot based on feedback from the camera images using any of the techniques described herein. The user of the handheld device can position the device close to the microdevice in the fluidic environment, such that the microdevice is visible in the image created by the imaging device. In certain embodiments, a neural network can be trained to preprocess the image from the imaging device, and identify the position of the microdevice in the field of view (e.g., draw a bounding box around the microdevice). In certain embodiments, the user can observe the microdevice in the image from the imaging device, and indicate the position of the microdevice within the image (e.g. by clicking on the microdevice in the image in a graphical user interface).

Referring still to FIG. 9, the user can indicate the goal position of the microdevice on the input image (e.g. by using a graphical user interface and clicking on the region in the image to which the microrobot need to go). In certain embodiments an artificial neural network can be used to identify the goal portion of the microdevice within the image. In certain embodiments, an artificial neural network controller can be used to generate commands to be sent to the plurality of electromagnetic coils of the device, in order to create forces and torques on the microdevice, which move the microdevice towards the goal position. In certain embodiments, the neural network controller can autonomously select actions to efficiently move the microdevice through the fluidic environment towards the goal position indicated by the user. In certain embodiments, the user can specify a path for the microdevice to follow via a series of waypoints indicated in the image within a graphical user interface. In certain embodiments, a path can be generated based on the current position of the microdevice, the current position of the goal, and an autonomous path planning algorithm.

In certain embodiments, the artificial neural network can identify actions that will result in movement of the microdevice along the path towards the goal position. In certain embodiments, the user of the device can move the device relative to the fluidic environment in order to keep the microdevice within the field of view of the imaging device and the effective working region of the electromagnetic coils. In certain embodiments, a robotic positioning mechanism can be used to move the device relative the fluidic environment in order to keep the microdevice within the field of view of the imaging device.

Figure 10:
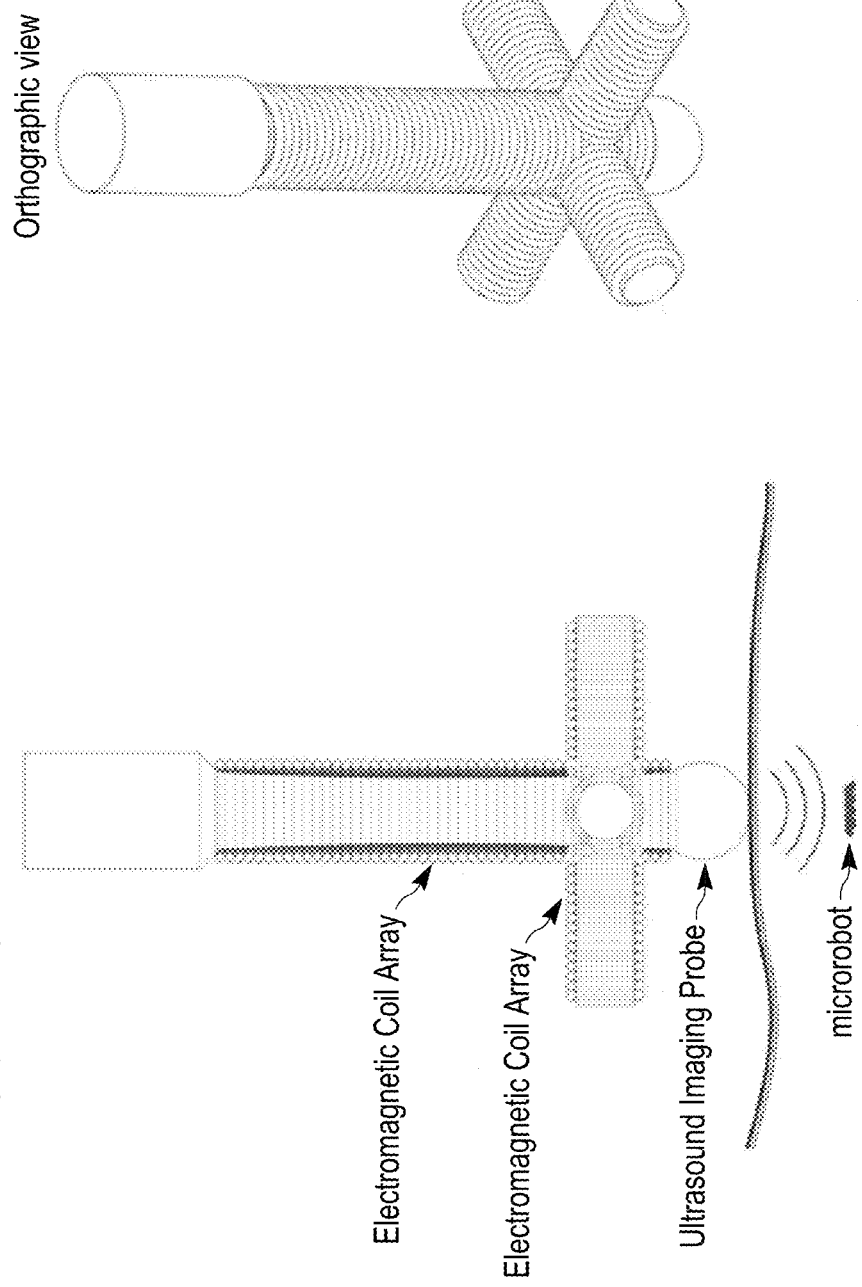
FIG. 10 is a diagram illustrating an example handheld device for simultaneous ultrasound imaging and magnetic actuation in accordance with the disclosed subject matter.

FIG. 10 is a diagram illustrating an alternative embodiment of a handheld device for simultaneous ultrasound imaging and magnetic actuation in accordance with the disclosed subject matter. As shown in FIG. 10, the handheld device can include an ultrasound imaging probe to image the microrobot in a fluidic medium, and an electromagnetic coil array to control movement of the microrobot based on feedback from the ultrasound images using any of the techniques described herein.

Figure 11:
FIG. 11 is an image illustrating example magnetic robots that can steer in an organ-on-a-chip in accordance with the disclosed subject matter.
Figure 11:
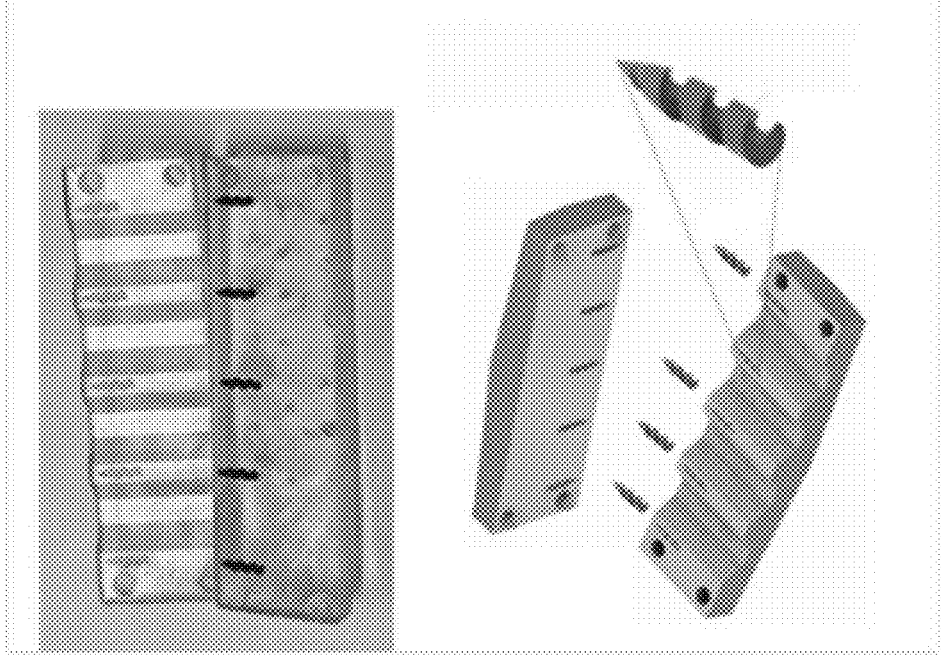

FIG. 11 is an image illustrating an exemplary system including magnetic microrobots that can be controlled in a three-dimensional culture of cells and tissues in accordance with the disclosed subject matter.

In certain embodiments, the microdevice can be placed in a three-dimensional culture of cells and tissues and manipulated in order to alter the state of the three-dimensional culture of cells and tissues. In certain embodiments, information derived from the cells and tissues in the three-dimensional culture system can be used in order to calculate the desired behavior of the microdevice. In certain implementations, the microdevice can be used to deliver drugs, mechanically perturb the system, or rearrange the configuration of cells and tissues within the three-dimensional culture system.

Figure 12:
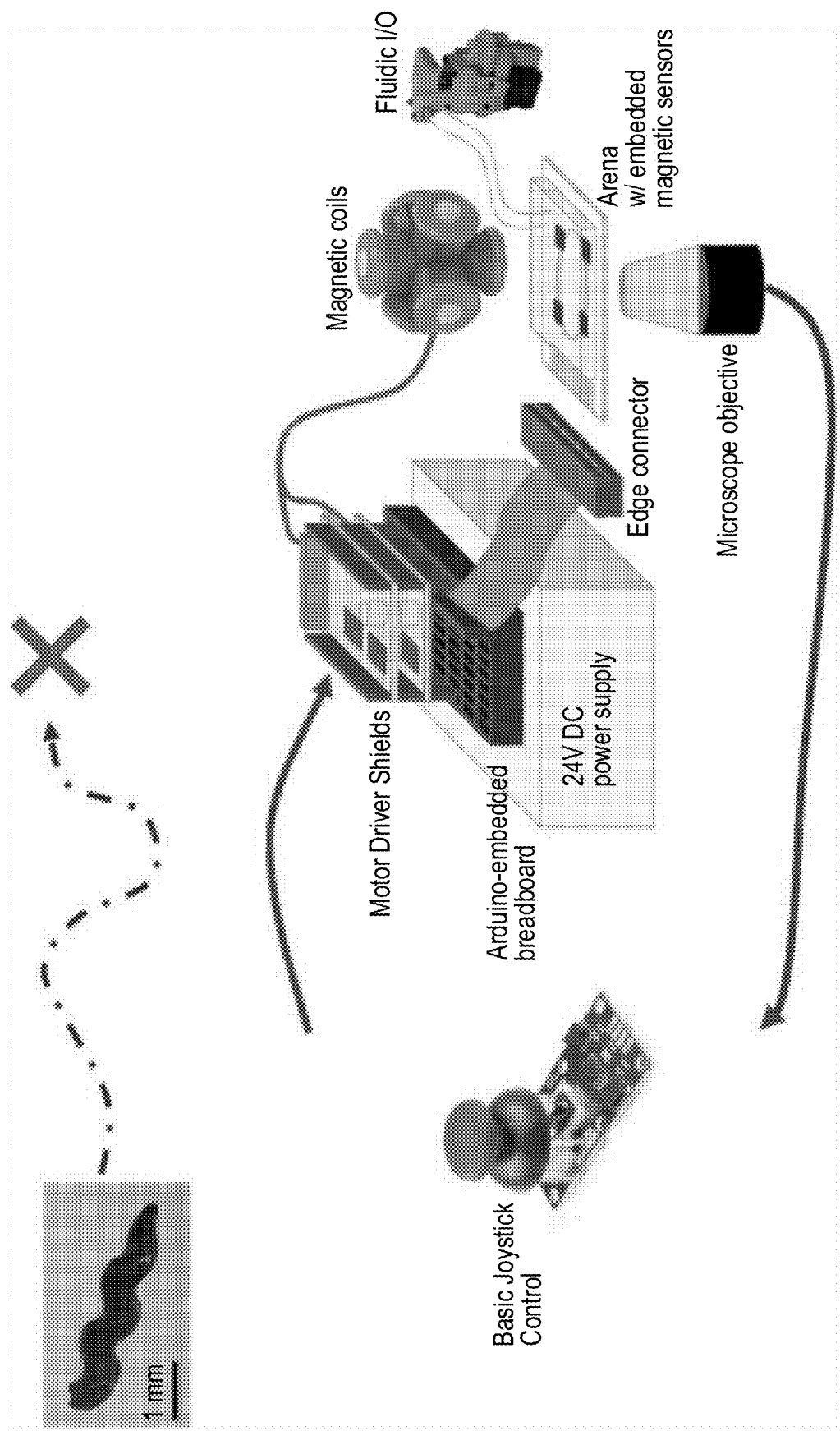
FIG. 12 is a diagram illustrating an example motion control with a joystick control in accordance with the disclosed subject matter.

FIG. 12 is a diagram illustrating an exemplary control system including a joystick control to control movement of magnetic microrobots in accordance with the disclosed subject matter. In certain embodiments a joystick can be configured such that the user of the device can indicate the desired behavior of the microdevice. In certain embodiments the artificial neural network controller can be configured to send current waveforms to the electromagnetic coils based upon the inputs from the user of the joystick.

Figure 13:
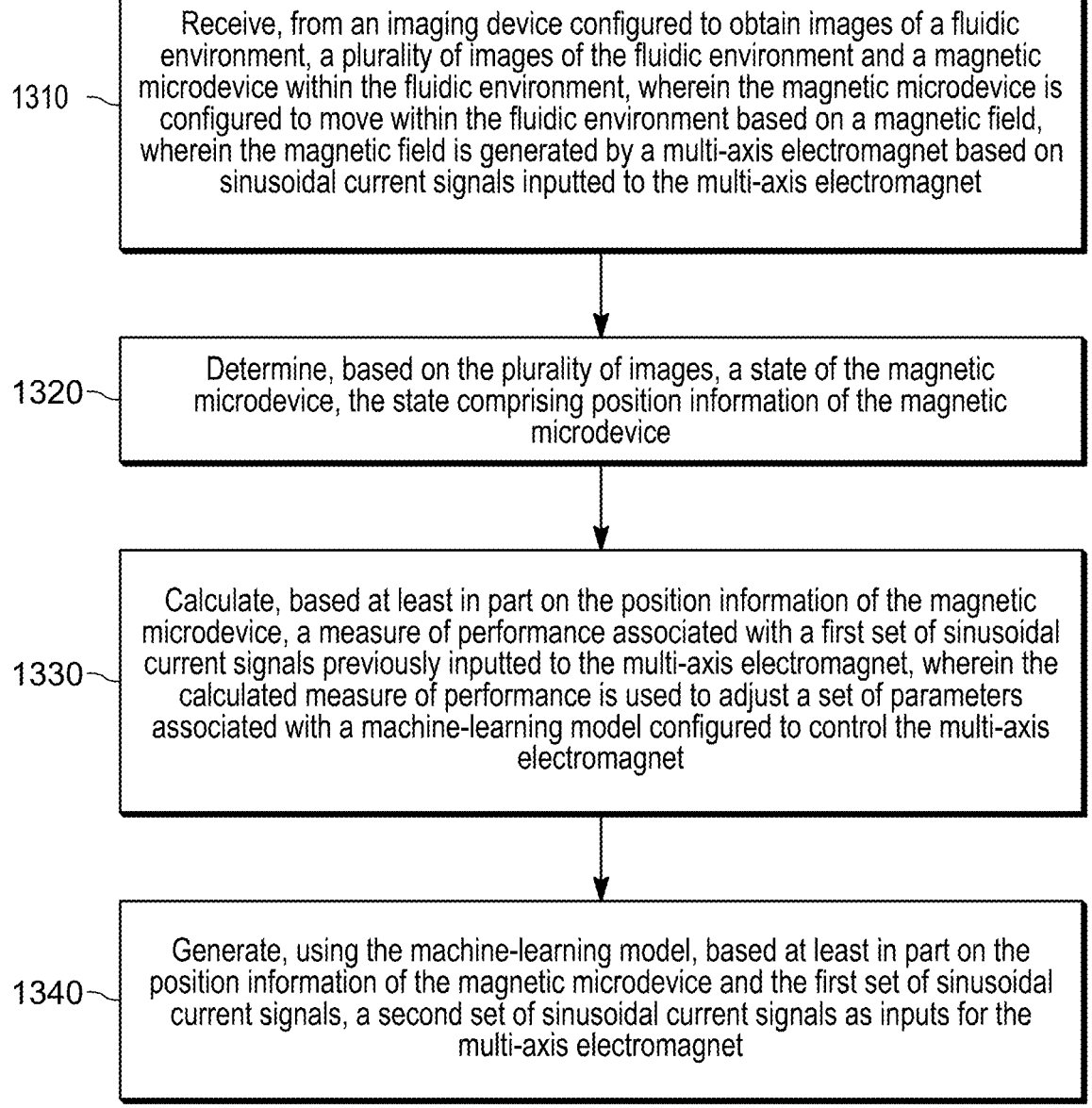
FIG. 13 illustrates an example method for controlling microrobots with unknown dynamics in uncharacterized environments in accordance with the disclosed subject matter.

FIG. 13 illustrates an example method 1400 for controlling microrobots with unknown dynamics in uncharacterized environments in accordance with the disclosed subject matter. The method can begin at step 1310, where the disclosed system can receive, from an imaging device configured to obtain images of a fluidic environment, a plurality of images of the fluidic environment and a magnetic microdevice within the fluidic environment, wherein the magnetic microdevice is configured to move within the fluidic environment based on a magnetic field, wherein the magnetic field is generated by a multi-axis electromagnet based on sinusoidal current signals inputted to the multi-axis electromagnet. At step 1320, the disclosed system can determine, based on the plurality of images, a state of the magnetic microdevice, the state comprising position information of the magnetic microdevice. At step 1330, the disclosed system can calculate, based at least in part on the position information of the magnetic microdevice, a measure of performance associated with a first set of sinusoidal current signals previously inputted to the multi-axis electromagnet, wherein the calculated measure of performance is used to adjust a set of parameters associated with a machine-learning model configured to control the multi-axis electromagnet. At step 1340, the disclosed system can generate, using the machine-learning model, based at least in part on the position information of the magnetic microdevice and the first set of sinusoidal current signals, a second set of sinusoidal current signals as inputs for the multi-axis electromagnet. Particular embodiments can repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for controlling microrobots with unknown dynamics in uncharacterized environments including the particular steps of the method of FIG. 13, this disclosure contemplates any suitable method for controlling microrobots with unknown dynamics in uncharacterized environments including any suitable steps, which can include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A system for controlling magnetic microdevices in a fluidic environment, comprising:
    a magnetic microdevice configured to move within a fluidic environment, the magnetic microdevice comprising a magnetically susceptible polymer in a helical configuration;
    an imaging device configured to obtain images of the fluidic environment, wherein each image indicates a position of the magnetic microdevice in the fluidic environment;
    a multi-axis electromagnet comprising a plurality of electromagnetic coils each associated with a respective axis, wherein the plurality of electromagnetic coils each is configured to receive a sinusoidal current signal and generate, based at least in part on the received sinusoidal current signal, a magnetic field associated with the axis of the electromagnetic coil, and wherein a superposition of the plurality of generated magnetic fields produces a non-uniform time-varying magnetic field in the fluidic environment; and
    a controller configured to control the multi-axis electromagnet based on a machine-learning model, wherein the controller is coupled to the imaging device and the multi-axis electromagnet, and wherein, for each of a plurality of time steps in a training session for the machine-learning model, the controller is configured to:
        receive, from the imaging device, a plurality of images of the fluidic environment and the magnetic microdevice;
        determine, based on the plurality of images, a state of the magnetic microdevice, the state comprising position information of the magnetic microdevice;
        calculate, based at least in part on the position information of the magnetic microdevice, a measure of performance associated with a first set of sinusoidal current signals previously inputted to the multi-axis electromagnet, wherein the calculated measure of performance is used to adjust a set of parameters associated with the machine-learning model; and
        generate, using the machine-learning model, based at least in part on the position information of the magnetic microdevice and the first set of sinusoidal current signals, a second set of sinusoidal current signals as inputs for the multi-axis electromagnet.

2. The system of claim 1, wherein the state of the magnetic microdevice is determined based on a plurality of state vectors, wherein each state vector is associated with one of the plurality of images received from the imaging device, and wherein each state vector is based at least in part on position information extracted from the associated image.

3. The system of claim 2, wherein the state vectors comprise parameters associated with one or more of: a position of the magnetic microdevice, a goal position of the magnetic microdevice, a magnitude of each of the first set of sinusoidal current signals, a phase angle for each of the first set of sinusoidal current signals, or a measure of time remaining in the training session.

4. The system of claim 2, wherein the machine-learning model comprises an artificial neural network, wherein the artificial neural network is a multilayer perceptron neural network, and wherein the plurality of state vectors is input to the multilayer perceptron neural network to calculate the measure of performance.

5. The system of claim 1, wherein the plurality of images is a set of sequential images of the magnetic microdevice, and wherein the state of the magnetic microdevice comprises the set of sequential images.

6. The system of claim 5, wherein each of the sequential images is augmented to indicate a goal position of the magnetic microdevice.

7. The system of claim 6, wherein the machine-learning model comprises an artificial neural network, wherein the artificial neural network is a convolutional neural network, and wherein the state of the magnetic microdevice comprising the set of sequential images is input to the convolutional neural network.

8. The system of claim 1, wherein the non-uniform time-varying magnetic field in the fluidic environment produced by the multi-axis electromagnet causes one or more forces or torques to be applied to the magnetic microdevice.

9. The system of claim 8, wherein the helical configuration of the magnetically susceptible polymer of the magnetic microdevice transduces the one or more forces or torques into a movement of the magnetic microdevice through the fluidic environment.

10. The system of claim 9, wherein the measure of performance is a reward signal representing a degree of desired behavior corresponding to the movement of the magnetic microdevice corresponding to the first set of sinusoidal current signals previously input to the multi-axis electromagnet.

11. The system of claim 10, wherein the machine-learning model comprises an artificial neural network, wherein the artificial neural network is iteratively trained over the plurality of time steps in the training session, by inputting, at each time step, the reward signal to a reinforcement learning algorithm.

12. The system of claim 11, wherein a measure of training session parameter performance is evaluated for each of a plurality of training sessions, wherein a rolling average of the training session parameter performance is periodically calculated over a predetermined number of previous training sessions, and wherein a set of parameters for a training session is saved as an updated magnetic microdevice control model if the rolling average of training session parameter performance associated with the training session exceeds a rolling average of training session parameter performance associated with a previously saved magnetic microdevice control model.

13. The system of claim 1, wherein the multi-axis electromagnet is a three-axis electromagnetic coil actuator comprising three electromagnetic coils, each associated with an X-axis, a Y-axis, or a Z-axis.

14. The system of claim 1, wherein each sinusoidal current signal received by an electromagnetic coil is a pulse-width modulated (PWM) signal generated by the controller.

15. The system of claim 1, wherein the imaging device is configured to obtain images of the fluidic environment, wherein the images comprise one or more of optical images or ultrasound images.

16. The system of claim 1, wherein the magnetically susceptible polymer is an agar hydrogel uniformly diffused with iron oxide nanoparticles.

17. The system of claim 1, wherein the multi-axis electromagnet and the imaging device are integrated into a handheld unit configured to be moved along a surface of an opaque object.

18. The system of claim 17, wherein the controller is further configured to dynamically identify an optimal magnetic field for controlling the magnetic microdevice based on a relative position of the magnetic microdevice to a position of the handheld unit and a goal position of the magnetic microdevice.

19. A method for controlling magnetic microdevices in a fluidic environment, comprising, by a computing system:
receiving, from an imaging device configured to obtain images of a fluidic environment, a plurality of images of the fluidic environment and a magnetic microdevice within the fluidic environment, wherein the magnetic microdevice is configured to move within the fluidic environment based on a magnetic field, and wherein the magnetic field is generated by a multi-axis electromagnet based on sinusoidal current signals inputted to the multi-axis electromagnet;
determining, based on the plurality of images, a state of the magnetic microdevice, the state comprising position information of the magnetic microdevice;
calculating, based at least in part on the position information of the magnetic microdevice, a measure of performance associated with a first set of sinusoidal current signals previously inputted to the multi-axis electromagnet, wherein the calculated measure of performance is used to adjust a set of parameters associated with a machine-learning model configured to control the multi-axis electromagnet; and
generating, using the machine-learning model, based at least in part on the position information of the magnetic microdevice and the first set of sinusoidal current signals, a second set of sinusoidal current signals as inputs for the multi-axis electromagnet.

20. One or more computer-readable non-transitory storage media embodying instructions for controlling magnetic microdevices in a fluidic environment that, when executed by a processor, cause performance of operations comprising:
receiving, from an imaging device configured to obtain images of a fluidic environment, a plurality of images of the fluidic environment and a magnetic microdevice within the fluidic environment, wherein the magnetic microdevice is configured to move within the fluidic environment based on a magnetic field, wherein the magnetic field is generated by a multi-axis electromagnet based on sinusoidal current signals inputted to the multi-axis electromagnet;
determining, based on the plurality of images, a state of the magnetic microdevice, the state comprising position information of the magnetic microdevice;
calculating, based at least in part on the position information of the magnetic microdevice, a measure of performance associated with a first set of sinusoidal current signals previously inputted to the multi-axis electromagnet, wherein the calculated measure of performance is used to adjust a set of parameters associated with a machine-learning model configured to control the multi-axis electromagnet; and
generating, using the machine-learning model, based at least in part on the position information of the magnetic microdevice and the first set of sinusoidal current signals, a second set of sinusoidal current signals as inputs for the multi-axis electromagnet.

\* \* \* \* \*